US008150056B2

(12) United States Patent
Inohara

(10) Patent No.: US 8,150,056 B2
(45) Date of Patent: Apr. 3, 2012

(54) AUDIO SIGNAL TRANSMITTING APPARATUS, AUDIO SIGNAL RECEIVING APPARATUS, AUDIO SIGNAL TRANSMISSION SYSTEM, AUDIO SIGNAL TRANSMISSION METHOD, AND PROGRAM

(75) Inventor: Yuichi Inohara, Tokyo (JP)

(73) Assignee: Sony Corporation, Tokyo (JP)

( * ) Notice: Subject to any disclaimer, the term of this patent is extended or adjusted under 35 U.S.C. 154(b) by 821 days.

(21) Appl. No.: 12/229,803

(22) Filed: Aug. 27, 2008

(65) Prior Publication Data

US 2009/0060219 A1 Mar. 5, 2009

(30) Foreign Application Priority Data

Aug. 28, 2007 (JP) ................................ 2007-221453

(51) Int. Cl.
*H04B 3/00* (2006.01)

(52) U.S. Cl. .................. 381/77; 381/2; 381/80; 381/85; 381/98; 700/94

(58) Field of Classification Search ................ 381/2, 77, 381/80, 85; 700/94; 438/2, 77, 80, 85
See application file for complete search history.

(56) References Cited

U.S. PATENT DOCUMENTS 5,406,634 A 4/1995 Anderson et al.
6,584,205 B1 * 6/2003 Croft et al. ...................... 381/98
7,343,017 B2 * 3/2008 Norris et al. .................... 381/77
2004/0096074 A1 5/2004 Bontempi et al.
2004/0223622 A1 11/2004 Lindemann et al.
2005/0177256 A1 8/2005 Shintani et al.
2009/0060206 A1 3/2009 Shiba
2009/0060220 A1 3/2009 Shiba

FOREIGN PATENT DOCUMENTS

JP 09-259539 A 10/1997
JP 2001-359200 A 12/2001
JP 2003-109298 A 4/2003
JP 2004-260281 A 9/2004
JP 2005-012534 A 1/2005
JP 2005-210504 A 8/2005
JP 2006-101081 A 4/2006
JP 2006-101496 A 4/2006
JP 2007-027928 2/2007
JP 2008-035400 2/2008

* cited by examiner

*Primary Examiner* — Dung A. Le
(74) *Attorney, Agent, or Firm* — Wolf, Greenfield & Sacks, P.C.

(57) ABSTRACT

There is provided an audio signal transmitting apparatus which can communicate with a plurality of external connection apparatuses and transmits audio signals to the external connection apparatuses. The audio signal transmitting apparatus includes an external output unit which outputs the audio signal to the outside, an audio signal transmitting unit which transmits the audio signal to the external connection apparatus being in a communicable state, and an audio output control unit which, when headphone information representing that a headphone function that outputs the audio signal through headphones is valid is received from at least one of the external connection apparatuses which receive the audio signals, performs control to stop an output by the external output unit.

21 Claims, 12 Drawing Sheets

FIG.5A

| | | |
|---|---|---|
| CH1 | No.1 | MAIN CHANNEL 1 (L) |
| | No.2 | MAIN CHANNEL 1 (R) |
| CH2 | No.3 | SUB-CHANNEL 1 |
| | No.4 | SUB-CHANNEL 2 |
| CH3 | No.5 | SUB-CHANNEL 3 |
| | No.6 | SUB-CHANNEL 4 |
| CH4 | No.7 | SUB-CHANNEL 5 |
| | No.8 | SUB-CHANNEL 6 |

FIG.5B

| | | |
|---|---|---|
| CH1 | No.1 | MAIN CHANNEL 1 (L) |
| | No.2 | MAIN CHANNEL 1 (R) |
| CH2 | No.3 | MAIN CHANNEL 2 (L) |
| | No.4 | MAIN CHANNEL 2 (R) |
| CH3 | No.5 | MAIN CHANNEL 3 (L) |
| | No.6 | MAIN CHANNEL 3 (R) |
| CH4 | No.7 | MAIN CHANNEL 4 (L) |
| | No.8 | MAIN CHANNEL 4 (R) |

FIG.9A

| | | |
|---|---|---|
| CH1 | No.1 | MAIN CHANNEL 1 (L) |
| | No.2 | MAIN CHANNEL 1 (R) |
| CH2 | No.3 | SURROUND REAR (L) |
| | No.4 | SURROUND REAR (R) |
| CH3 | No.5 | SURROUND BACK (L) |
| | No.6 | SURROUND BACK (R) |
| CH4 | No.7 | UNUSED |
| | No.8 | UNUSED |

FIG.9B

| | | |
|---|---|---|
| CH1 | No.1 | MAIN CHANNEL 1 (L) |
| | No.2 | MAIN CHANNEL 1 (R) |
| CH2 | No.3 | SURROUND REAR HEADPHONE (L) |
| | No.4 | SURROUND REAR HEADPHONE (R) |
| CH3 | No.5 | SURROUND BACK (L) |
| | No.6 | SURROUND BACK (R) |
| CH4 | No.7 | UNUSED |
| | No.8 | UNUSED |

FIG.9C

| | | |
|---|---|---|
| CH1 | No.1 | MAIN CHANNEL 1 (L) |
| | No.2 | MAIN CHANNEL 1 (R) |
| CH2 | No.3 | SURROUND REAR HEADPHONE (L) |
| | No.4 | SURROUND REAR HEADPHONE (R) |
| CH3 | No.5 | SURROUND BACK HEADPHONE (L) |
| | No.6 | SURROUND BACK HEADPHONE (R) |
| CH4 | No.7 | UNUSED |
| | No.8 | UNUSED |

FIG.9D

| | | |
|---|---|---|
| CH1 | No.1 | MAIN CHANNEL 1 (L) |
| | No.2 | MAIN CHANNEL 1 (R) |
| CH2 | No.3 | SURROUND REAR (L) |
| | No.4 | SURROUND REAR (R) |
| CH3 | No.5 | SURROUND BACK HEADPHONE (L) |
| | No.6 | SURROUND BACK HEADPHONE (R) |
| CH4 | No.7 | UNUSED |
| | No.8 | UNUSED |

AUDIO SIGNAL TRANSMITTING APPARATUS, AUDIO SIGNAL RECEIVING APPARATUS, AUDIO SIGNAL TRANSMISSION SYSTEM, AUDIO SIGNAL TRANSMISSION METHOD, AND PROGRAM

CROSS-REFERENCE TO RELATED APPLICATION

The present invention contains subject matter related to Japanese Patent Application JP 2007-221453 filed in the Japan Patent Office on Aug. 28, 2007, the entire contents of which being incorporated herein by reference.

BACKGROUND OF THE INVENTION

1. Field of the Invention

The present invention relates an audio signal transmitting apparatus, an audio signal receiving apparatus, an audio signal transmission system, an audio signal transmission method, and a program.

2. Description of the Related Art

In recent years, with popularization of a home theater system and development of an information transmission technique, a technique that transmits an audio signal by using a plurality of channels has been actively used. In a system (audio signal transmission system) such as the home theater system which transmits an audio signal, an apparatus (transmitting apparatus) which transmits an audio signal and an apparatus (receiving apparatus) which receives an audio signal are often connected to each other through various connection cables.

In order to increase the degree of freedom of a layout of a plurality of loudspeakers configuring a home theater system, a so-called wireless connection between a transmitting apparatus which provides a sound source and a loudspeaker serving as a receiving apparatus has been attempted without using a connection cable (for example, see Japanese Patent Application Laid-Open No. 2007-27928).

SUMMARY OF THE INVENTION

In an audio signal transmission system in the past such as a home theater system, a transmitting apparatus can hardly recognize various operations performed to a receiving apparatus. For this reason, with an operation performed in the receiving apparatus, an issue in that an audio output from the transmitting apparatus can be hardly properly managed is posed.

When a plurality of receiving apparatuses are connected to a transmitting apparatus, an issue in that, on the basis of an operation performed in one of the receiving apparatuses, the transmitting apparatus can hardly properly manage an audio output from the other receiving apparatus is also posed.

Therefore, the present invention has been made in consideration of the above issues. It is desirable to properly manage an audio output from the other apparatus on the basis of an operation performed in one apparatus in an audio signal transmitting apparatus, an audio signal receiving apparatus, an audio signal transmission system, an audio signal transmission method, and a program.

According to an embodiment of the present invention, there is provided an audio signal transmitting apparatus which can communicate with a plurality of external connection apparatuses and transmits audio signals to the external connection apparatuses, including: an external output unit which outputs the audio signal to the outside; an audio signal transmitting unit which transmits the audio signal to the external connection apparatus being in a communicable state; and an audio output control unit which, when headphone information representing that a headphone function that outputs the audio signal through headphones is valid is received from at least one of the external connection apparatuses which receive the audio signals, performs control to stop an output by the external output unit.

The audio output control unit may further perform control to stop an external output of the audio signal received by the at least one of the external connection apparatuses.

The audio output control unit, when the other external connection apparatus except for the at least one of the external connection apparatuses is in a communicable state, may perform control to stop an external output of the audio signal received by the other external connection apparatus.

The audio output control unit may further perform control to make the headphone function of the other external connection apparatus valid.

The audio output control unit may further perform control to make the headphone function of the audio signal transmitting apparatus valid.

The audio signal transmitting unit can further include a channel mapping information generating unit which transmits the audio signals to the external connection apparatuses through a plurality of channels and which, when the headphone information is received from at least one of the external connection apparatuses, changes channel mapping information representing each of types of the audio signals transmitted through the plurality of channels into information including a type of the audio signal which can be output from the external connection apparatus having the valid headphone function.

The audio signal transmitting apparatus can further include a channel mapping information providing unit which provides the channel mapping information changed by the channel mapping information generating unit to at least the external connection apparatus which transmits the headphone information.

The audio output control unit may control the external connection apparatus which acquires the changed channel mapping information from the channel mapping information providing unit to stop an external output of the audio signal received by the external connection apparatus.

The audio output control unit may control the external connection apparatus which does not acquire the changed channel mapping information from the channel mapping information providing unit to maintain an external output of the audio signal received by the external connection apparatus.

The audio signal transmitting apparatus further includes: an output permission/nonpermission determining unit which determines whether an external output of the audio signal need to be stopped with respect to each of the external connection apparatuses which can communicate with the audio signal transmitting apparatus on the basis of a type of an audio signal which can be output by the external connection apparatus; and a mute signal transmitting unit which transmits a mute signal which directs the external connection apparatus to stop an external output of the audio signal depending on a determination of the output permission/nonpermission determining unit, the audio output control unit may control the mute signal transmitting unit to transmit the mute signal to the external connection apparatus in which it is determined by the output permission/nonpermission determining unit that the external output of the audio signal needs to be stopped, and the audio output control unit may control the mute signal transmitting unit not to transmit the mute signal to the external connection apparatus in which it is determined by the output permission/nonpermission determining unit that the external output of the audio signal does not need to be stopped.

The audio signal transmitting apparatus further includes a mute signal transmitting unit which transmits a mute signal which directs the external connection apparatus to stop an external output of the audio signal to the external connection apparatus, and the audio signal transmitting unit transmits the audio signals to the external connection apparatuses through a plurality of channels, and the audio output control unit may control the mute signal transmitting unit to transmit the mute signal to the external connection apparatus which externally outputs the audio signal transmitted through a specific channel of the plurality of channels.

The audio signal transmitting apparatus further includes a connection state management unit which, when headphone cancellation information representing that the headphone function is canceled is received, determines the presence/absence of the external connection apparatus the headphone function of which is valid, the audio output control unit may perform control to maintain a stop state of an output by the external output unit when the connection state management unit determines that the external connection apparatus the headphone function of which is valid is present, and the audio output control unit may perform control to restart the output by the external output unit when the connection state management unit determines that the external connection apparatus the headphone function of which is valid is absent.

The audio signal transmitting unit transmits the audio signals to the external connection apparatuses through the plurality of channels, and the audio signal transmitting apparatus and the external connection apparatuses may output the audio signals transmitted through the different channels corresponding to the same contents.

The audio signal transmitting apparatus may be able to wirelessly communicate with the plurality of external connection apparatuses.

According to another embodiment of the present invention, there is provided an audio signal receiving apparatus which can communicate with a plurality of external connection apparatuses and outputs the audio signals received from the external connection apparatuses, including: an audio signal receiving unit which receives the audio signal from the external connection apparatus being in a communicable state; and a headphone information transmitting unit which, when a headphone function that outputs the audio signal by headphones is valid, transmits headphone information representing that the headphone function is valid to the external connection apparatus.

The audio signal receiving apparatus can also further include a headphone output unit which outputs the audio signals received by the audio signal receiving unit by the headphones; a channel mapping information acquiring unit which acquires channel mapping information representing types of the audio signals transmitted through the plurality of channels from the external connection apparatus; an output permission/nonpermission determining unit which determines whether the audio signals received by the audio signal receiving unit include an audio signal for headphone output serving as a type of the audio signal which can be output from the headphone output unit on the basis of the acquired channel mapping information; and an audio output control unit which, when the headphone function is valid, when the output permission/nonpermission determining unit determines that the audio signal for headphone output is included, controls the audio signal for headphone output to output the audio signal for headphone output to the headphone output unit.

The audio signal receiving apparatus further includes an external output unit which outputs the audio signal received by the audio signal receiving unit to the outside, the output permission/nonpermission determining unit further determines whether the audio signal received by the audio signal receiving unit includes an audio signal for external output serving as the type of the audio signal which can be output by the external output unit on the basis of the acquired channel mapping information, and the audio output control unit may perform control to stop an output by the external output unit when the output permission/nonpermission determining unit determines that the audio signal for external output is not included when the headphone function is valid.

According to still further embodiment of the present invention, there is provided an audio signal transmission system including: an audio signal transmitting apparatus which transmits an audio signal to an external connection apparatus; and an audio signal receiving apparatus which outputs the audio signal received from the audio signal transmitting apparatus.

In the audio signal transmission system, the audio signal transmitting apparatus includes: an external output unit which outputs the audio signal to the outside; an audio signal transmitting unit which transmits the audio signal to the audio signal receiving apparatus being in a communicable state; and an audio output control unit which, when headphone information representing that a headphone function that outputs the audio signal by headphones is valid is received from at least one of the audio signal receiving apparatuses which receive the audio signals, performs control to stop an output by the external output unit.

The audio signal receiving apparatus includes: an audio signal receiving unit which receives the audio signal from the audio signal transmitting apparatus being in a communicable state; and a headphone information transmitting unit which transmits the headphone information to the audio signal transmitting apparatus.

According to still another embodiment of the present invention, there is provided an audio signal transmission method in an audio signal transmission system including an audio signal transmitting apparatus which transmits an audio signal to an external connection apparatus and an audio signal receiving apparatus which outputs the audio signal received from the audio signal transmitting apparatus, including the steps of: causing the audio signal transmitting apparatus to transmit the audio signal to the audio signal receiving apparatus; causing the audio signal receiving apparatus to receive the audio signal from the audio signal transmitting apparatus; causing the audio signal receiving apparatus which receives the audio signal to transmit headphone information representing that the headphone function is valid to the audio signal transmitting apparatus when a headphone function that outputs the audio signal by headphones is valid; and causing the audio signal transmitting apparatus to stop an external output of the audio signal by the audio signal transmitting apparatus when the headphone information is received from at least one of the audio signal receiving apparatuses which receive the audio signals.

According to still another embodiment of the present invention, there is provided a program which is executed in an audio signal transmitting apparatus which can communicate with a plurality of external connection apparatuses and which transmits audio signals to the external connection apparatuses, causing a computer to realize: an audio output function that outputs the audio signal to the outside; an audio signal transmitting function that transmits the audio signal to the external connection apparatus being in a communicable state; and an audio output control function that, when headphone information representing that a headphone function that outputs the audio signal by headphones is valid is received from the at least one of the external connection apparatuses which receive the audio signals, performs control to stop an output by the audio output function.

According to the configuration, the computer program is stored in a storage unit included in the computer and loaded on and executed by a CPU included in the computer, so that the computer functions as the audio signal transmitting apparatus. A computer readable recording medium on which the computer program is recorded can also be provided. The recording medium is, for example, a magnetic disk, an optical disk, a magnetooptical disk, a flash memory, or the like. The computer program may be delivered through, for example, a network without using a recording medium.

According to still another embodiment of the present invention, there is provided a program executed in the audio signal receiving apparatus which can communicate with a plurality of external connection apparatuses and outputs the audio signals received from the external connection apparatuses, causing a computer to realize: an audio signal receiving function that receives the audio signal from the audio signal transmitting apparatus being in a communicable state; and a headphone information transmitting function that transmits headphone information representing that a headphone function that outputs the audio signal by headphones is valid to the audio signal transmitting apparatus.

According to the configuration, the computer program is stored in a storage unit included in a computer and loaded on and executed by a CPU included in the computer, so that the computer functions as the audio signal transmitting apparatus. A computer readable recording medium on which the computer program is recorded can also be provided. The recording medium is, for example, a magnetic disk, an optical disk, a magnetooptical disk, a flash memory, or the like. The computer program may be delivered through, for example, a network by using the recording medium.

According to the audio signal transmitting apparatus, the audio signal receiving apparatus, the audio signal transmission system, the audio signal transmission method, and the program according to the present invention having the configurations described above, on the basis of an operation performed by one of the apparatuses, an audio output from the other apparatus can be appropriately managed.

The headphones in the present invention means not only so-called headphones or an earphone but also any apparatus which directly acquires an audio signal from the audio signal transmitting apparatus, which indirectly acquires an audio signal from an external connection apparatus which receives an audio signal from the audio signal transmitting apparatus, and which outputs the acquired audio information by using a loudspeaker being close to an ear. More specifically, as the headphones according to the present invention, various types of headphones such as an earphone, inner-ear-type headphones (hooked on outer ears), canal-type headphones (inserted into ear holes deeply more than the inner-ear-type headphones), head-band-type headphones (put on a head), neck-band-type (worn on the back of a neck), ear-hook-type headphones, clip-type headphones (clips are hooked on outer ears), and the like are given.

According to the embodiments of the present invention, in the audio signal transmitting apparatus, the audio signal receiving apparatus, the audio signal transmission system, the audio signal transmission method, and the program, on the basis of an operation performed by one of the apparatuses, an audio output from the other apparatus can be appropriately managed.

BRIEF DESCRIPTION OF THE DRAWINGS

FIG. 5A is an explanatory diagram for explaining an example of channel mapping information according to the embodiment;

FIG. 5B is an explanatory diagram for explaining an example of the channel mapping information according to the embodiment;

FIG. 9A is an explanatory diagram for explaining an example of the channel mapping information according to the embodiment;

FIG. 9B is an explanatory diagram for explaining an example of the channel mapping information according to the embodiment;

FIG. 9C is an explanatory diagram for explaining an example of the channel mapping information according to the embodiment;

FIG. 9D is an explanatory diagram for explaining an example of the channel mapping information according to the embodiment;

DETAILED DESCRIPTION OF THE PREFERRED EMBODIMENTS

Figure 1:
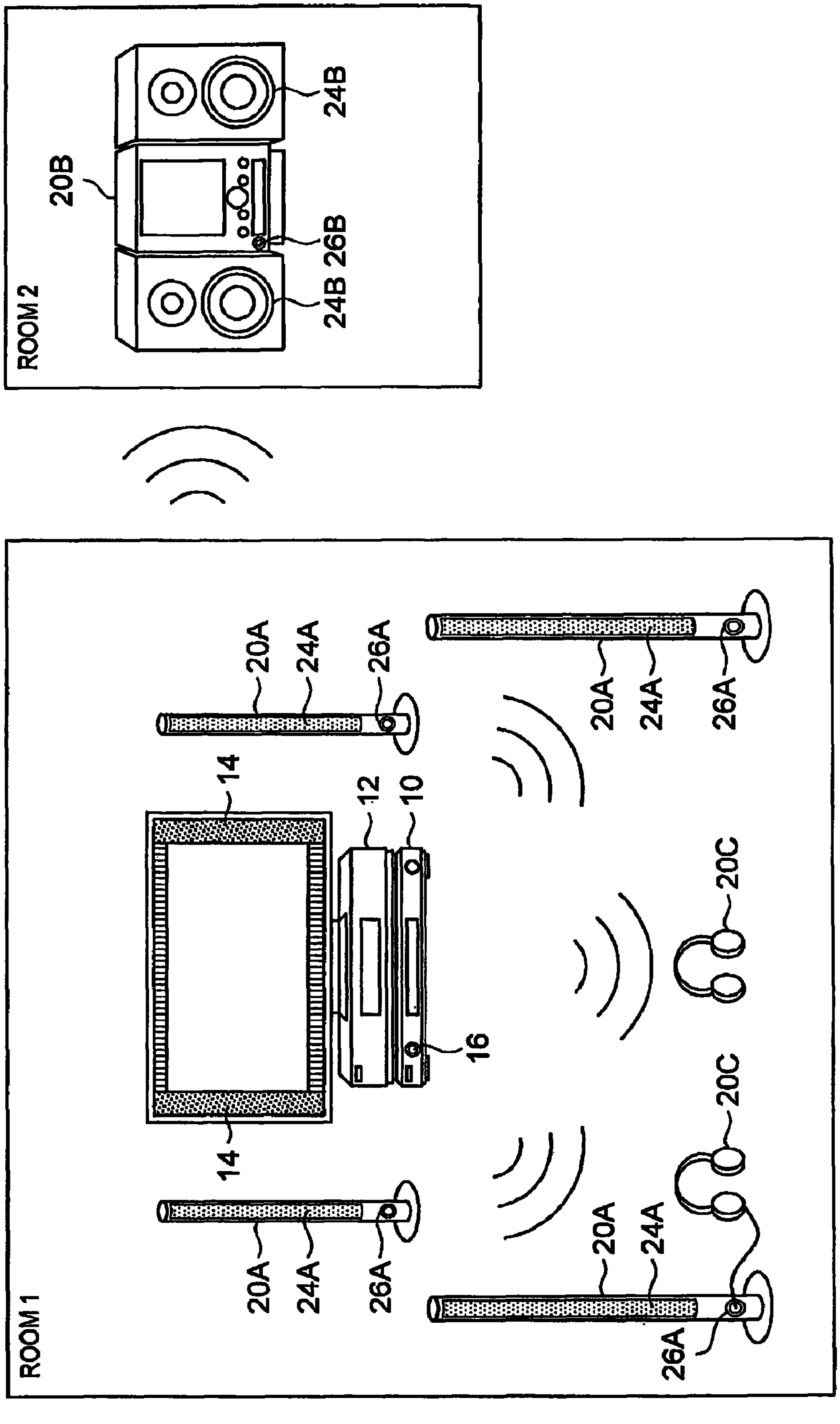
FIG. 1 is an explanatory diagram for explaining an entire configuration of an audio signal transmission system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment (Outline of Audio Signal Transmission System 1)

An outline of an audio signal transmission system 1 according to a first embodiment of the present invention will be described below in detail with reference to FIG. 1. FIG. 1 is an explanatory diagram showing an entire configuration of the audio signal transmission system 1 according to the embodiment.

As shown in FIG. 1, the audio signal transmission system 1 according to the embodiment includes an audio signal transmitting apparatus 10 and audio signal receiving apparatuses 20A and 20B (which may be collectively called an "audio signal receiving apparatus 20" hereinafter).

The audio signal transmitting apparatus 10 transmits an audio signal to an audio signal receiving apparatus 20 serving as an external connection apparatus by wired transmission or wireless transmission and receives various pieces of information transmitted from the audio signal receiving apparatus 20. FIG. 1 shows an example in which an audio signal is wirelessly transmitted. The audio signal transmitting apparatus 10 may acquire an audio signal to be wirelessly transmitted from an audio signal output apparatus 12 such as a DVD player or a Blu-ray disk (to be abbreviated as a BD hereinafter), and the audio signal transmitting apparatus 10 itself may have a function of the audio signal output apparatus. The audio signal transmitting apparatus 10 and the audio signal receiving apparatus 20 perform transmission of an audio signal or interactive data communication of various pieces of information by using, for example, a radio wave band. For this reason, the audio signal transmitting apparatus 10 and the audio signal receiving apparatus 20, as shown in FIG. 1, may be arranged in the same room (ROOM 1), or may be separately arranged in different rooms (ROOM 1 and ROOM 2), respectively.

The audio signal receiving apparatus 20 receives an audio signal transmitted from the audio signal transmitting apparatus 10 and outputs the received audio signal as sound. The audio signal receiving apparatus 20 transmits, to the audio signal transmitting apparatus 10, information related to connection of the audio signal receiving apparatus 20, a signal which notifies the audio signal transmitting apparatus 10 that the audio signal receiving apparatus 20 outputs (headphone-outputs) an audio signal by headphones, and various pieces of information such as a desirable change notice of an audio signal to be transmitted. As the audio signal receiving apparatus 20, for example, as shown in ROOM 1 in FIG. 1, a surround speaker group 20A wirelessly connected to the audio signal transmitting apparatus 10 may be used, or as shown in ROOM 2 in FIG. 1, an audio signal output apparatus such as an audio component 20B which outputs an audio signal wirelessly transmitted from the audio signal transmitting apparatus 10 may be used. The audio signal receiving apparatus 20, for example, may be an audio signal acquiring apparatus such as headphones 20C or an earphone which can be connected to the audio signal transmitting apparatus 10 by wired or wireless transmission.

In the audio signal transmitting apparatus 10 and the audio signal receiving apparatuses 20A and 20B, loudspeakers 14, 24A, and 24B to externally output audio signals, and headphone output terminals 16A, 26A, and 26B to connect an audio signal acquiring apparatus such as headphones 20C through a cable are arranged.

In the audio signal transmission system 1, the audio signal transmitting apparatus 10 confirms the presence/absence of the audio signal receiving apparatus 20 connected to the audio signal transmitting apparatus 10 at predetermined time intervals. On the other hand, when a new external connection apparatus such as the headphones 20C is connected to the audio signal receiving apparatus 20 to change an output state of an audio signal (for example, change from an external output into a headphone output), or when a user executes any operation to the audio signal receiving apparatus 20, the audio signal receiving apparatus 20 transmits information representing that effect to the audio signal transmitting apparatus 10. In this manner, the audio signal transmitting apparatus 10 can automatically recognize various operation performed in the audio signal receiving apparatus 20.

In the audio signal transmitting apparatus 10 according to the embodiment, for example, when the headphones 20C is connected to one surround speaker 20A of the surround speaker group connected to the audio signal transmitting apparatus 10, the audio signal transmitting apparatus 10 can acquire information representing the headphones 20C are connected to the surround speaker 20A. When the audio signal transmitting apparatus 10 acquires information representing that the headphones 20C are connected to one surround speaker 20A of the surround speaker group, the audio signal transmitting apparatus 10 can perform control to stop (mute) an external output from the loudspeaker 14 from the audio signal transmitting apparatus 10 itself. Furthermore, when the audio signal transmitting apparatus 10 acquires information representing that the headphones 20C are connected to one surround speaker 20A of the surround speaker group, the audio signal transmitting apparatus 10 can perform control to stop an external output from the loudspeaker unit 24A of the other surround speaker 20A.

Not only when the headphones 20C are connected one surround speaker 20A of the surround speaker group but also when the headphones 20C are connected to the audio signal transmitting apparatus 10 itself by wire through a headphone output terminal 16 or when the wireless headphones 20C are wirelessly connected to the audio signal transmitting apparatus 10, the audio signal transmitting apparatus 10 can perform the same control.

On the other hand, when the audio signal receiving apparatus 20 is, for example, the audio component 20B arranged in a room different from the room in which the surround speaker 20A to which the audio signal receiving apparatus 20 are connected is arranged, an external output of an audio signal by the audio component 20B does not need to be stopped. Therefore, in this case, the audio signal transmitting apparatus 10 can also perform control to maintain the external output of the audio signal by the audio component 20B.

Configurations of the audio signal transmitting apparatus 10 and the audio signal receiving apparatus 20 which configure the audio signal transmission system 1 described above will be described below in detail.

(Hardware Configuration of Audio Signal Transmitting Apparatus 10)

Figure 2:
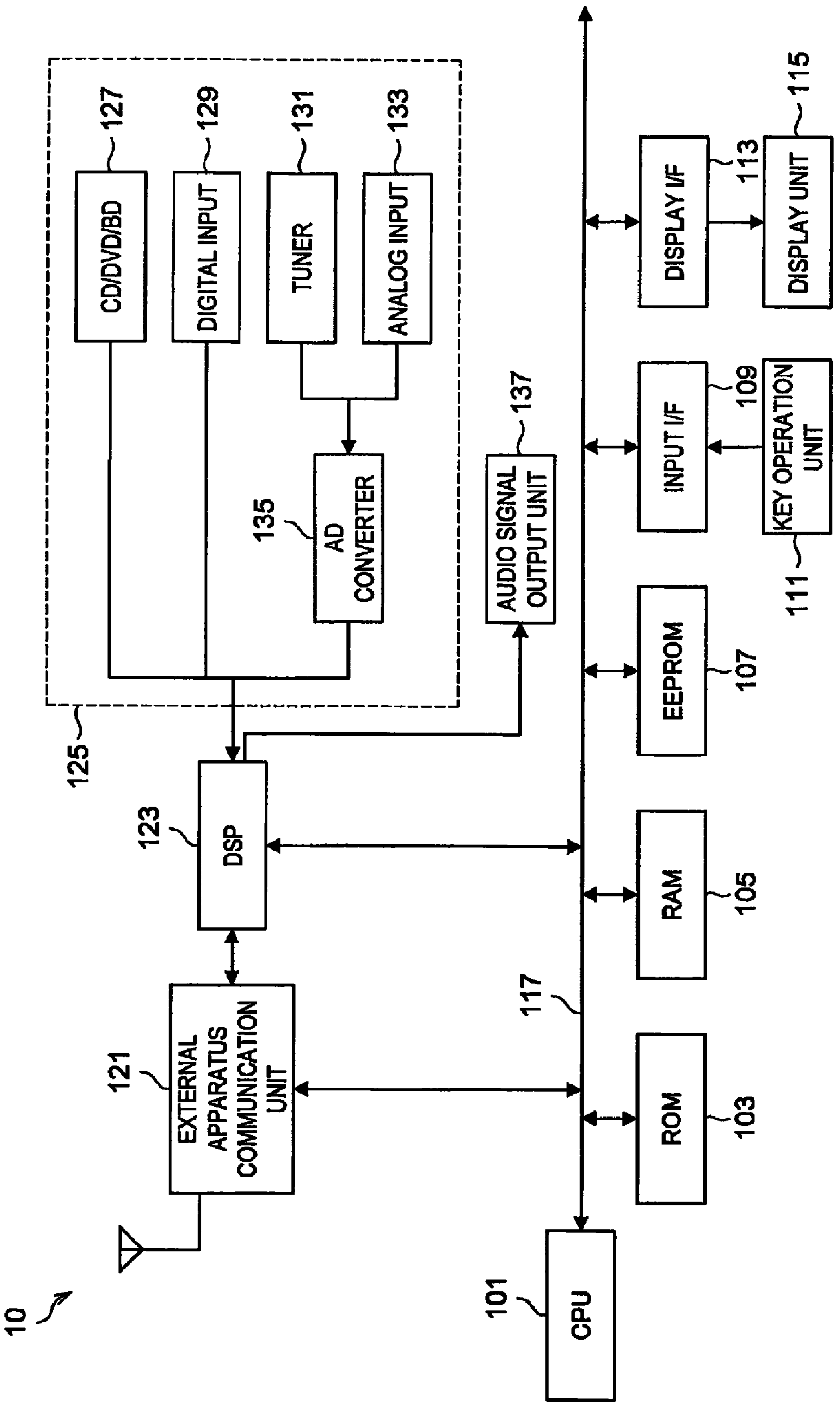
FIG. 2 is a block diagram showing a hardware configuration of an audio signal transmitting apparatus according to the embodiment.

A hardware configuration of the audio signal transmitting apparatus 10 according to the embodiment will be described below with reference to FIG. 2. FIG. 2 is a block diagram showing the hardware configuration of the audio signal transmitting apparatus 10 according to the embodiment.

As shown in FIG. 2, the audio signal transmitting apparatus 10 according to the embodiment includes a CPU (Central Processing Unit) 101, an ROM (Read Only Memory) 103, a RAM (Random Access Memory) 105, an EEPROM (Electronically Erasable and Programmable Read Only Memory) 107, an input interface (I/F) 109, a display interface (I/F) 113, and an external apparatus communication unit 121.

A DSP (Digital Signal Processor) 123 is connected to the external apparatus communication unit 121.

The CPU 101 functions as an arithmetic processing unit and a control unit and controls an entire operation or a part of the operation in the audio signal transmitting apparatus 10 according to various programs recorded on the ROM 103, the RAM 105, the EEPROM 107, and the like. The ROM 103 and the EEPROM 107 store a program, an operation parameter, and the like used by the CPU 101. The RAM 105 temporarily stores a program used in execution of the CPU 101, a parameter properly changed in the execution, and the like. These components are connected to each other by a host bus including an internal bus such as a CPU bus and a system bus 117 including an external bus such as a PCI (Peripheral Component Interconnect/Interface) bus.

The input interface 109 is an interface which includes an input control circuit or the like which generates an input signal on the basis of information input by user by means of the key operation unit 111 and outputs the input signal to the CPU 101. The user of the audio signal transmitting apparatus 10 can input various data or designate a processing operation to the audio signal transmitting apparatus 10 by operating the key operation unit 111 described below.

The key operation unit 111 is an operation unit which inputs various data or designates a processing operation to the audio signal transmitting apparatus 10. The key operation unit 111, for example, is an operation unit such as a mouse, a keyboard, a touch panel, a button, a switch, or a lever which operated by a user. The key operation unit 111, for example, may be a remote control unit (so-called remote controller) using an infrared ray or other radio waves or an external connection apparatus such as a mobile phone or a PDA corresponding to an operation of the audio signal transmitting apparatus 10.

The display interface 113 is an interface to transmit an output signal output from the CPU 101 to the display unit 115 (will be described later). The display unit 115, for example, includes a display apparatus such as a CRT display device, a liquid crystal display device, a plasma display device, an EL display device, or a lamp which can visually notify a user of various pieces of information.

The external apparatus communication unit 121, for example, is a communication interface including a communication apparatus or the like to communicate with the audio signal receiving apparatus 20 or various audio signal output apparatuses. The external apparatus communication unit 121 may be an interface conforming to a general wireless audio transmission rule or an interface conforming to a specific wireless audio transmission rule. As the external apparatus communication unit 121, as a matter of course, for example, may be an external output terminal (not shown) to perform data communication with the audio signal transmitting apparatus 10 by wire through a cable or the like. The audio signal transmitting apparatus 10 according to the embodiment transmits an audio signal to the audio signal receiving apparatus 20 through the external apparatus communication unit 121 and performs interactive data communication with the audio signal receiving apparatus 20.

The DSP 123 is a CPU specialized for various processes for an audio signal or an image signal. To the DSP 123, an audio signal input unit 125 to which an audio signal used in transmission is input and an audio signal output unit 137 which outputs the acquired audio signal are connected.

The audio signal input unit 125 is a processing unit to which an audio signal used in transmission by the audio signal transmitting apparatus 10 according to the embodiment is input. The audio signal input unit 125, for example, includes a CD/DVD/BD 127, a digital input 129 to which a digital apparatus such as an MD (Mini Disk) is connected, a tuner (TUNER) 131, an analog input 133 to which an analog apparatus such as a cassette tape recorder or a record player is connected, and the like. Audio signals input from the tuner 131 and the analog input 133 are converted from analog signals to digital signals by the AD converter 135. The audio signal input by the audio signal input unit 125 is transmitted to the audio signal receiving apparatus 20 through the DSP 123 and the external apparatus communication unit 121.

The audio signal output unit 137 is a processing unit which outputs the audio signal input from the audio signal input unit 125 to the outside of the audio signal transmitting apparatus 10. The audio signal output unit 137 includes, for example, a DA converter (not shown) which converts an audio signal serving as a digital signal into an analog signal, an amplification unit (not shown) which amplifies the audio signal converted into the analog signal, a loudspeaker (not shown) which outputs the amplified audio signal, and the like.

The audio signal transmitting apparatus 10 according to the embodiment may include, in addition to the above configuration, for example, a storage device (not shown), a drive (not shown), and the like.

The storage device is a data storage device configured as an example of a storage unit of the audio signal transmitting apparatus 10 according to the embodiment, and the storage device includes, for example, a magnetic storage unit apparatus such as an HDD (Hard Disk Drive), a semiconductor memory device, an optical memory device, a magnetooptical storage device, and the like. The storage device can store a program executed by the CPU 101, various data, an audio signal acquired from the outside, and the like.

The drive is a reader/writer for a storage medium which is incorporated or externally attached to the audio signal transmitting apparatus 10. The drive reads information recorded on a removal recording medium such as a loaded magnetic disk, an optical disk, a magnetooptical disk, or a semiconductor memory and outputs the information to the RAM 105. The drive can also write a record in a removal recording medium such as a loaded magnetic disk, an optical disk, a magnetooptical disk, or a semiconductor memory. The removal recording medium, for example, is a DVD media, an HD-DVD media, a Blu-ray media, a compact flash (registered trademark) (CompactFlash: CF), a memory stick, an SD memory card (Secure Digital memory card), or the like. The removal recording medium, for example, may be an IC card (Integrated Circuit card) on which a noncontact IC chip is mounted, an electronic device, or the like.

With the above configuration described above, the audio signal transmitting apparatus 10 acquires audio signals from various audio signal output sources, makes it possible to transmit the audio signal to the audio signal receiving apparatus 20 through the external apparatus communication unit 121, and can perform interactive data communication with the audio signal receiving apparatus 20.

An example of the hardware configuration which can realize the function of the audio signal transmitting apparatus 10 according to the embodiment is described above. The constituent elements may be configured by using general-purpose members or may include hardware specialized for the functions of the constituent elements. Therefore, depending on a technological level obtained each time the embodiment is executed, hardware configurations to be used can be arbitrarily changed.

(Hardware Configuration of Audio Signal Receiving Apparatus 20)

Figure 3:
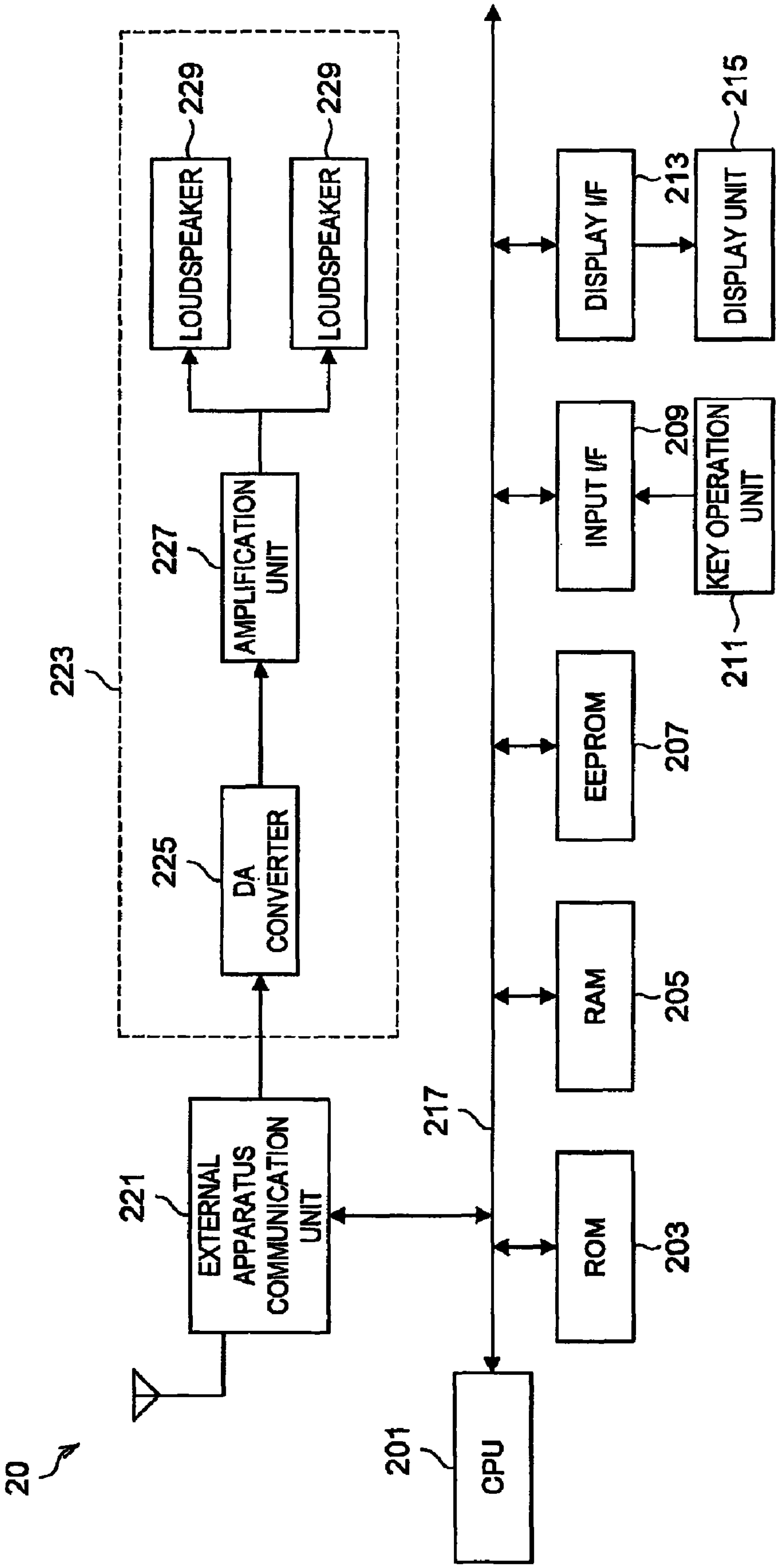
FIG. 3 is a block diagram showing a hardware configuration of an audio signal receiving apparatus according the embodiment.

Subsequently, with reference to FIG. 3, a hardware configuration of the audio signal receiving apparatus 20 according to the embodiment will be described in detail. FIG. 3 is a block diagram showing the hardware configuration of the audio signal receiving apparatus 20 according to the embodiment.

As shown in FIG. 3, the audio signal receiving apparatus 20 according to the embodiment includes a CPU 201, a ROM 203, a RAM 205, an EEPROM 207, an input interface (I/F) 209, a display interface (I/F) 213, and an external apparatus communication unit 221.

To the external apparatus communication unit 221, an audio signal output unit 223 which outputs a received audio signal is connected.

The CPU 201 functions as an arithmetic processing unit and a control unit and controls an entire operation or a part of the operation in the audio signal receiving apparatus 20 according to various programs recorded on the ROM 203, the RAM 205, the EEPROM 207, and the like. The ROM 203 and the EEPROM 207 store a program, an operation parameter, and the like used by the CPU 201. The RAM 205 temporarily stores a program used in execution of the CPU 201, a parameter properly changed in the execution, and the like. These components are connected to each other by a host bus including an internal bus such as a CPU bus and a system bus 217 including an external bus such as a PCI bus.

The input interface 209 is an interface which includes an input control circuit or the like which generates an input signal on the basis of information input by user by means of a key operation unit 211 and outputs the input signal to the CPU 201. The user of the audio signal receiving apparatus 20 can input various data or designate a processing operation to the audio signal receiving apparatus 20 by operating the key operation unit 211 described below.

The key operation unit 211 is an operation unit which inputs various data or designates a processing operation to the audio signal receiving apparatus 20. The key operation unit 211, for example, is an operation unit such as a mouse, a keyboard, a touch panel, a button, a switch, or a lever which operated by a user. The key operation unit 211, for example, may be a remote control unit (so-called remote controller) using an infrared ray or other radio waves or an external connection apparatus such as a mobile phone or a PDA corresponding to an operation of the audio signal receiving apparatus 20.

The display interface 213 is an interface to transmit an output signal output from the CPU 201 to a display unit 215 (will be described later). The display unit 215, for example, includes a display apparatus such as a CRT display device, a liquid crystal display device, a plasma display device, an EL display device, or a lamp which can visually notify a user of various pieces of information.

The external apparatus communication unit 221, for example, is a communication interface including a communication apparatus or the like to communicate with the audio signal transmitting apparatus 10 or various audio signal output apparatuses. The external apparatus communication unit 221 may be an interface conforming to a general wireless audio transmission rule or an interface conforming to a specific wireless audio transmission rule. As the external apparatus communication unit 221, as a matter of course, for example, may be an external output terminal (not shown) to perform data communication with the audio signal transmitting apparatus 10 by wire through a cable or the like. The audio signal receiving apparatus 20 according to the embodiment receives an audio signal from the audio signal transmitting apparatus 10 through the external apparatus communication unit 221 and performs interactive data communication with the audio signal transmitting apparatus 10.

The audio signal output unit 223 is a processing unit which outputs an audio signal transmitted from the audio signal transmitting apparatus 10. The audio signal output unit 223, as shown in FIG. 3, includes, for example, a DA converter 225, an amplification unit 227, and a loudspeaker 229.

The DA converter 225 converts the received audio signal from a digital signal to an analog signal. The audio signal converted into the analog signal is amplified by the amplification unit 227 and output from the loudspeaker 229.

The audio signal receiving apparatus 20 according to the embodiment may include a DSP and an audio signal input unit included in the audio signal transmitting apparatus 10 according to the embodiment. Furthermore, the audio signal receiving apparatus 20 may include, in addition to the above configuration, for example, a storage device (not shown), a drive (not shown), and the like.

The storage device is a data storage device configured as an example of a storage unit of the audio signal receiving apparatus 20 according to the embodiment, and the storage device includes, for example, a magnetic storage unit apparatus such as an HDD (Hard Disk Drive), a semiconductor memory device, an optical memory device, a magnetooptical storage device, and the like. The storage device can store a program executed by the CPU 201, various data, an audio signal acquired from the outside, and the like.

The drive is a reader/writer for a storage medium which is incorporated or externally attached to the audio signal receiving apparatus 20. The drive reads information recorded on a removal recording medium such as a loaded magnetic disk, an optical disk, a magnetooptical disk, or a semiconductor memory and outputs the information to the RAM 205. The drive can also write a record in a removal recording medium such as a loaded magnetic disk, an optical disk, a magnetooptical disk, or a semiconductor memory. The removal recording medium, for example, is a DVD media, an HD-DVD media, a Blu-ray media, a compact flash (registered trademark), a memory stick, an SD memory card, or the like. The removal recording medium, for example, may be an IC card on which a noncontact IC chip is mounted, an electronic device, or the like.

With the above configuration described above, the audio signal receiving apparatus 20 can acquire audio signals from the audio signal transmitting apparatus 10 through the external apparatus communication unit 221, and can perform interactive data communication with the audio signal transmitting apparatus 10.

An example of the hardware configuration which can realize the function of the audio signal receiving apparatus 20 according to the embodiment is described above. The constituent elements may be configured by using general-purpose members or may include hardware specialized for the functions of the constituent elements. Therefore, depending on a technological level obtained each time the embodiment is executed, hardware configurations to be used can be arbitrarily changed.

(Functional Configuration of Audio Signal Transmitting Apparatus 10)

Figure 4:
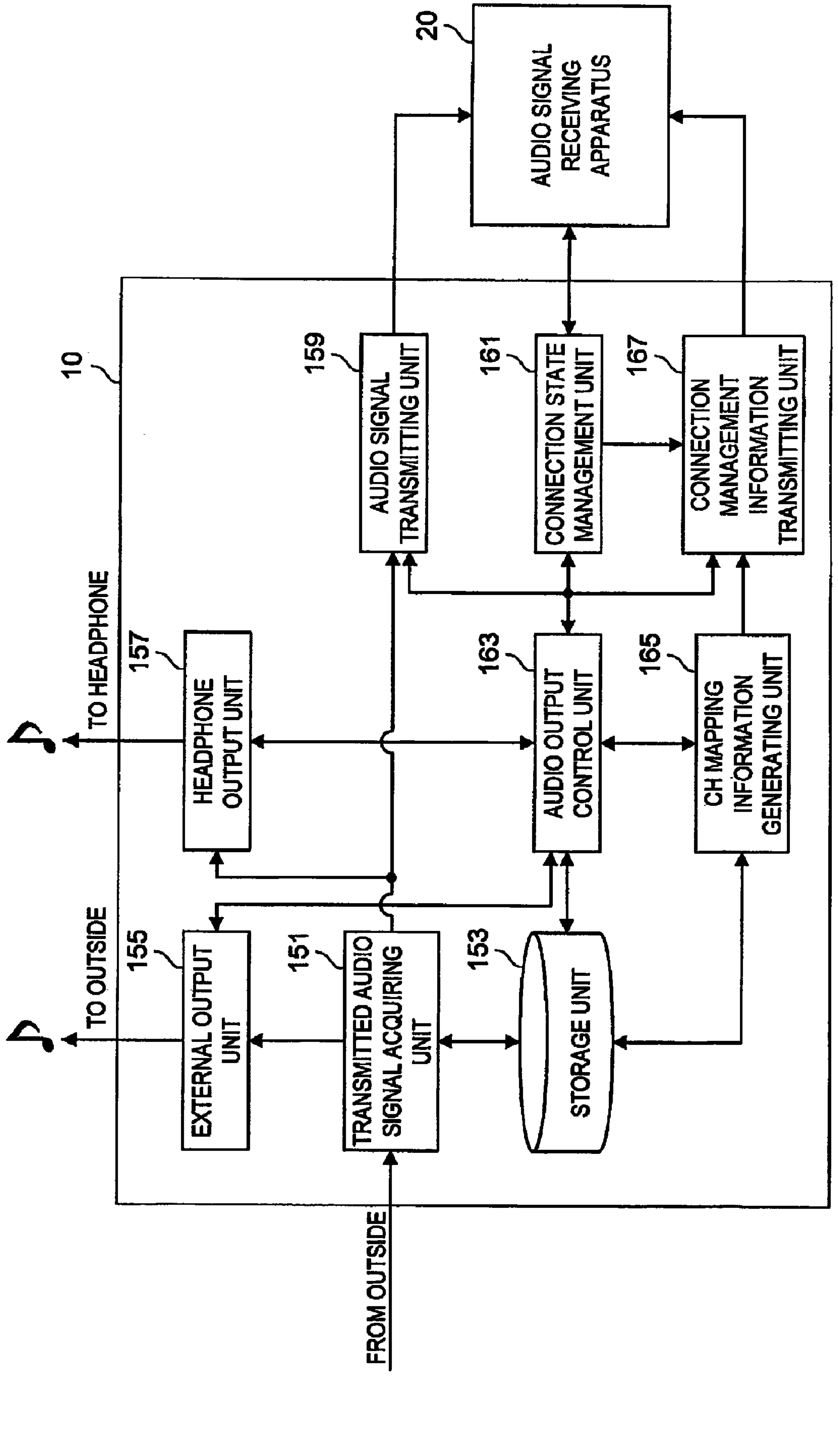
FIG. 4 is a block diagram showing a functional configuration of the audio signal transmitting apparatus according to the embodiment.

A functional configuration of the audio signal transmitting apparatus 10 according to the embodiment realized by the above hardware configuration will be described below in detail with reference to FIG. 4. FIG. 4 is a block diagram showing the functional configuration of the audio signal transmitting apparatus 10 according to the embodiment.

As shown in FIG. 4, the audio signal transmitting apparatus 10 includes a transmitted audio signal acquiring unit 151, a storage unit 153, an external output unit 155, a headphone output unit 157, an audio signal transmitting unit 159, a connection state management unit 161, an audio output control unit 163, a channel (CH) mapping information generating unit 165, and a connection management information transmitting unit 167.

The transmitted audio signal acquiring unit 151, for example, includes a CPU, a ROM, a RAM, an EEPROM, an external apparatus communication unit, and the like, acquires an audio signal output from an audio signal output apparatus 12 such as a CD player, a DVD player, or a BD player, and obtains an audio signal to be transmitted to the audio signal receiving apparatus 20. The transmitted audio signal acquiring unit 151 can also acquire an audio signal obtained by a radio broadcast or the like through a tuner or the like. Furthermore, the transmitted audio signal acquiring unit 151 can acquire an audio signal from the storage unit 153 when an audio signal is recorded on the storage unit 153. The audio signal acquired by the transmitted audio signal acquiring unit 151 can be transmitted to the external output unit 155, the headphone output unit 157, and the audio signal transmitting unit 159 (will be described later). The audio signal acquired by the transmitted audio signal acquiring unit 151 may be stored in the storage unit 153.

In the storage unit 153, for example, the audio signal acquired by the transmitted audio signal acquiring unit 151, a database in which types of audio signals structuring CH mapping information (will be described later) are recorded, various pieces of transmitting information which can be transmitted to the audio signal receiving apparatus 20, various programs and processing methods used by the audio signal transmitting apparatus 10 according to the embodiment, and the like are stored.

Furthermore, the storage unit 153 can arbitrarily store, in addition to the data base and the programs, various parameters or intermediate steps of processing which need to be stored when the audio signal transmitting apparatus 10 performs any process. In the storage unit 153, the transmitted audio signal acquiring unit 151, the audio output control unit 163, the CH mapping information generating unit 165, and the like can freely write data.

The external output unit 155 includes, for example, a DA converter, an amplifier, a loudspeaker, and the like, and outputs an audio signal transmitted from the transmitted audio signal acquiring unit 151 to the outside of the audio signal transmitting apparatus 10. Output control of the audio signal obtained by the external output unit 155 is performed by the audio output control unit 163 (will be described later).

The headphone output unit 157, for example, is connected to an audio signal acquiring apparatus such as headphones connected to the audio signal transmitting apparatus 10 by wired or wireless transmission, and outputs an audio signal transmitted from the transmitted audio signal acquiring unit 151 to the audio signal acquiring apparatus. Output control of an audio signal obtained by the headphone output unit 157 is performed by the audio output control unit 163 (will be described later).

The audio signal transmitting unit 159, for example, includes a CPU, a ROM, a RAM, an EEPROM, a DSU, an external apparatus communication unit, and the like. The audio signal transmitting unit 159 distributes audio signals to the respective channels on the basis of the CH mapping information transmitted from the CH mapping information generating unit 165 through the audio output control unit and transmits the audio signals to the audio signal receiving apparatus 20 in a communicable state. When an audio signal to be transmitted needs to be converted to cope with types of the audio signals (attributes of audio signals) in the channels described in the CH mapping information, the audio signal transmitting unit 159 performs a predetermined conversion process to the audio signal to be transmitted and transmits the converted audio signal. In this case, as the conversion process described above, for example, when an unconverted audio signal is an audio signal corresponding to a 5.1 channel system, the audio signal may be down-mixed to a normal 2-channel audio signal. The process performed by the audio signal transmitting unit 159 is controlled by the audio output control unit 163 (will be described later).

The "channel (CH) mapping information" mentioned here is a set of pieces of information representing the types of the audio signals transmitted through the plurality of channels. As the types of the audio signals, like a type of an audio signal acquired from a DVD or a type of an audio signal or the like acquired from a apparatus connected to a digital input, a type representing a source of an audio signal, as in sub-sound or the like for a sub-woofer, a surround rear speaker or a surround back speaker, a type representing that an audio signal is for surround sound, and the like are known. The details of the channel mapping information (CH mapping information) will be described later.

The connection state management unit 161 includes, for example, a CPU, a ROM, a RAM, an EEPROM, and the like, and performs connection controls of the external connection apparatuses such as the audio signal receiving apparatus 20 connected to the audio signal transmitting apparatus 10 at once. When the connection state management unit 161 receives a connection establishment request transmitted from the external connection apparatus such as the audio signal receiving apparatus 20, the connection state management unit 161 determines whether the connection is permitted. When the connection state management unit 161 determines that the connection may be established, the connection state management unit 161 establishes the connection to the external connection apparatus. When the connection state management unit 161 receives a connection cancellation request transmitted from the external connection apparatus such as the audio signal receiving apparatus 20, the connection state management unit 161 cancels the connection to the audio signal receiving apparatus 20. More specifically, the connection state management unit 161 controls connections to the external connection apparatuses depending on the presence/absence or the operation state of an external connection apparatus which can be connected to the audio signal transmitting apparatus 10 (for example, the audio signal receiving apparatus 20 according to the embodiment or an external connection apparatus such as headphones connected to the audio signal transmitting apparatus 10 and/or the audio signal receiving apparatus 20).

The connection state management unit 161 manages a connection state of an external connection apparatus which can be connected to the audio signal transmitting apparatus 10. The connection state management unit 161 recognizes the number or operation states of external connection apparatuses which can be connected to the audio signal transmitting apparatus 10 on the basis of information (to be referred to as "operation state information" hereinafter) related to the operation state of the audio signal receiving apparatus 20 transmitted from the audio signal receiving apparatus 20 and performs connection management. More specifically, the connection state management unit 161 transmits operation state confirmation signals which confirm the operation state of the audio signal receiving apparatuses 20 to all the audio signal receiving apparatuses 20 at predetermined time intervals (for example, by one minute) to check the audio signal receiving apparatus 20 which makes a response. The connection state management unit 161 determines that the audio signal receiving apparatus 20, which made a response, is in an operation state.

When the connection state management unit 161 receives the contents related to various pieces of information transmitted from the audio signal receiving apparatus 20 to the audio signal transmitting apparatus 10, the connection state management unit 161 changes the connection state of the audio signal receiving apparatus 20 depending on the received contents. As the various pieces of information, for example, a connection establishment request of the audio signal receiving apparatus 20, a connection cancellation request of the audio signal receiving apparatus 20, a request to desire to change types of audio signals transmitted from the audio signal transmitting apparatus 10, information (headphone information) representing that an external output of the audio signal receiving apparatus 20 is changed into a headphone output, information (headphone cancellation information) representing that the headphone output of the audio signal receiving apparatus 20 is changed into a headphone output, and the like are given.

In the audio signal transmitting apparatus 10 according to the embodiment, in order to change connection states of the audio signal receiving apparatus 20, the connection state management unit 161 requests the CH mapping information generating unit 165 through the audio output control unit 163 (will be described later) to change CH mapping information, i.e. to generate new CH mapping information. In this manner, the connection state management unit 161 manages the presence/absence or operation states of various external connection apparatuses which can be connected to the audio signal transmitting apparatus 10 at once.

The audio output control unit 163 controls an operation method of an audio signal in the audio signal transmitting apparatus 10 itself and at least one of the audio signal receiving apparatuses 20 which are connected to the audio signal transmitting apparatus 10 and are in communicable states. More specifically, the audio output control unit 163 determines contents of information related to the operation state of the audio signal receiving apparatus 20 transmitted from the connection state management unit 161 and various pieces of information related to the audio signal receiving apparatus 20 transmitted from the connection state management unit 161 with reference to various databases and the like stored in, for example, the storage unit 153. As a result, when the number of external connection apparatuses connected to the audio signal transmitting apparatus 10 is updated, or when operation states of the connected external connection apparatuses are changed, it is determined that the CH mapping information used at the present need to be changed. The audio output control unit 163 requests the CH mapping information generating unit 165 (will be described later) to generate new CH mapping information (to update the CH mapping information used at the present). Furthermore, the audio output control unit 163 requests the connection management information transmitting unit 167 (will be described later) to transmit the CH mapping information updated by the CH mapping information generating unit 165 to the audio signal receiving apparatus 20.

On the other hand, in the audio signal receiving apparatus 20, on the basis of the CH mapping information received from the connection management information transmitting unit 167, an audio signal which can be output is selected from the audio signals corresponding to the plurality of channels received from the audio signal transmitting unit 159 and output. More specifically, on the basis of a type (CH mapping information) of an audio signal included in the audio signals corresponding to the plurality of channels, and audio signal which can be output is determined in the audio signal receiving apparatus 20. Therefore, the audio output control unit 163 causes the CH mapping information generating unit 165 to generate desired CH mapping information, so that an output of the audio signal in the audio signal receiving apparatus 20 can be controlled.

With respect to an output of an audio signal in the audio signal transmitting apparatus 10, the audio output control unit 163 directly controls the external output unit 155 or the headphone output unit 157 to make it possible to control the output of the audio signal in the audio signal transmitting apparatus 10. For example, when the audio output control unit 163 receives information representing that the headphones can be connected to the audio signal transmitting apparatus 10 from the connection state management unit 161, the audio output control unit 163 stops the output of the audio signal from the external output unit 155 to make it possible to control the headphone output unit 157 to output an audio signal.

The audio output control unit 163, as described above, control an output of an audio signal in the audio signal transmitting apparatus 10 itself and the audio signal receiving apparatus 20.

The CH mapping information generating unit 165, for example, includes a CPU, a ROM, a RAM, an EEPROM, and the like, and generates new CH mapping information depending on a request from the audio output control unit 163. In generation of the new CH mapping information, the CH mapping information generating unit 165 dynamically generates CH mapping information to change a connection state of the audio signal receiving apparatus 20 serving as the external connection apparatus and various requests from the audio signal receiving apparatus 20 with reference to the various databases stored in, for example, the storage unit 153 and various pieces of information transmitted from the connection state management unit 161. In particular, in the CH mapping information generating unit 165 according to the embodiment, as various pieces of information transmitted from the connection state management unit 161, headphone information, headphone cancellation information, and the like are given. As described above, the CH mapping information generating unit 165 generates appropriate CH mapping information depending an output state of the audio signal receiving apparatus 20 which transmits the pieces of information when the pieces of information are transmitted from the connection state management unit 161 through the audio output control unit 163.

The generated new CH mapping information is output to the audio signal transmitting unit 159 through the connection management information transmitting unit 167 (will be described later) and the audio output control unit 163. An output from the CH mapping information generating unit 165 to the audio signal transmitting unit 159 may be directly performed without passing through the audio output control unit 163. The generated new CH mapping information may be recorded on the storage unit 153.

The connection management information transmitting unit 167 functions as a channel mapping information providing unit according to the embodiment. More specifically, the connection management information transmitting unit 167 transmits connection management information including the CH mapping information generated by the CH mapping information generating unit 165 and information representing a connection state to the audio signal transmitting apparatus 10 such as connection establishment or connection cancellation issued by the connection state management unit 161 to the external connection apparatus such as the audio signal receiving apparatus 20. In this case, the connection management information means information related to a connection to the audio signal transmitting apparatus 10 such as reception of an audio signal transmitted from the audio signal transmitting apparatus 10 as described above and connection establishment or connection cancellation notified by the audio signal transmitting apparatus 10.

Transmission of the connection management information may be performed to all the external connection apparatuses regardless of establishment of a connection. The transmission may be performed to an external connection apparatus which transmits a transmission request of connection management information. With respect to transmission of the CH mapping information, the connection management information transmitting unit 167 may voluntarily transmit the CH mapping information generated by the CH mapping information generating unit 165 when the CH mapping information generating unit 165 transmits the CH mapping information. The connection management information transmitting unit 167 may transmit the CH mapping information together with the new CH mapping information when data communication with the external connection apparatus occurs.

In this case, the audio output control unit 163 has, in the output controls described above, in particular, an important point in which a headphone function that outputs an audio signal by the headphones from at least one of the audio signal receiving apparatuses 20 serving as external connection apparatuses which receive audio signals from the audio signal transmitting unit 159 is valid, i.e., an output control performed when headphone information representing that a headphone output is being performed is received can be performed. In this case, the audio output control unit 163 can perform the following controls (1) to (5):

(1) An output of an audio signal by the external output unit 155 is stopped.

(2) An external output of an audio signal by the audio signal receiving apparatus 20 which transmits headphone information is stopped.

(3) When another external connection apparatus (including the audio signal receiving apparatus 20) except for the audio signal receiving apparatus 20 which transmits headphone information can communicate with the audio signal transmitting apparatus 10, an external output of an audio signal by the other external connection apparatus is stopped.

(4) When another external connection apparatus except for the audio signal receiving apparatus 20 which transmits headphone information can communicate with the audio signal transmitting apparatus 10, the headphone function of the other external connection apparatus is made valid (the output of the audio signal is changed into the headphone output).

(5) The headphone function of the audio signal transmitting apparatus 10 itself is made valid (the output of the audio signal is changed into the headphone output).

After the audio output control unit 163 acquires headphone information from at least one audio signal receiving apparatus 20, when the headphone function is canceled, i.e., headphone cancellation information representing that the headphone output is changed into the external output again, depending on the presence/absence of the external connection apparatus the headphone function of which is valid, the following controls (6) and (7) can be performed:

(6) When at least one external connection apparatus having a valid headphone function is present, a stop state of an output by the external output unit 155 and an output by the headphone output unit 157 are maintained.

(7) When external connection apparatus having a valid headphone function is absent (in case of 0), when at least one external connection apparatus having a valid headphone function is present, an output by the external output unit 155 is restarted, and an output by the headphone output unit 157 is stopped.

The controls (1) to (7) will be described below in detail with reference to contents which the audio output control unit 163 requests from the CH mapping information generating unit 165.

With respect to (1) to (5), when the audio output control unit 163 receives headphone information representing that a headphone output is set from at least one audio signal receiving apparatus 20 of the audio signal receiving apparatuses 20 serving as external connection apparatuses which receive audio signals from the audio signal transmitting unit 159, the audio output control unit 163 stops an output of an audio signal by the external output unit 155, and an output of an audio signal by the headphone output unit 157 is started. More specifically, the audio output control unit 163 stops transmission of the audio signal to the external output unit 155 and performs control to start transmission of the audio signal to the headphone output unit 157.

With respect to (2), when the audio output control unit 163 receives headphone information representing that a headphone output is set from at least one audio signal receiving apparatus 20 of the audio signal receiving apparatuses 20 serving as external connection apparatuses which receive audio signals from the audio signal transmitting unit 159, the audio output control unit 163 requests the CH mapping information generating unit 165 to generate CH mapping information in which an audio signal for an external output is changed into a signal for a headphone output. Furthermore, the audio output control unit 163 controls the connection management information transmitting unit 167 to transmit the changed CH mapping information to the audio signal receiving apparatus 20 which transmits a headphone signal. When the audio signal receiving apparatus 20 receives the changed CH mapping information, on the basis of the CH mapping information, the audio signal receiving apparatus 20 determines whether an audio signal which can be output is present. As a result of the determination, in the audio signal receiving apparatus 20, since it is determined on the basis of the received CH mapping information that the audio signal for an external output is absent, an external output of an audio signal in the audio signal receiving apparatus 20 is automatically stopped.

With respect to (3), the audio output control unit 163 controls the connection management information transmitting unit 167 such that the changed CH mapping information is also transmitted to another audio signal receiving apparatus 20 except for the audio signal receiving apparatus 20 which transmits a headphone signal. When the other audio signal receiving apparatus 20 receives the changed CH mapping information, as in the audio signal receiving apparatus 20 which transmits a headphone signal, the external output of the audio signal is automatically stopped.

The audio output control unit 163, for example, as shown in FIG. 1, can also control the CH mapping information generating unit 165 such that, in the audio signal receiving apparatus 20 such as an audio component 20B arranged in a room different from that of the audio signal transmitting apparatus 10, the external output is changed into the headphone output with respect to a signal for an audio signal output in the audio component 20B. Alternatively, the connection management information transmitting unit 167 can also be controlled not to transmit the CH mapping information transmitted to the audio signal receiving apparatus 20 arranged in the same room as that of the audio signal transmitting apparatus 10. With this control, in the audio component 20B arranged in the room different from that of the audio signal transmitting apparatus 10, an external output of an audio signal can be continued, the external output of the audio signal can be prevented from being suddenly stopped despite the intention of a user.

With respect to (4), as described above, the audio output control unit 163 controls the connection management information transmitting unit 167 such that the CH mapping information changed as described above is also transmitted to another audio signal receiving apparatus 20 except for the audio signal receiving apparatus 20 which transmits a headphone signal. When the other audio signal receiving apparatus 20 receives the changed CH mapping information, the audio signal receiving apparatus 20 determines on the basis of the CH mapping information whether an audio signal which can be output is present. As a result of the determination, in the audio signal receiving apparatus 20, since it is determined that the audio signal for a headphone output is present in the received CH mapping information, the headphone output of the audio signal in the audio signal receiving apparatus 20 is automatically started.

With respect to (6), after the connection state management unit 161 acquires the headphone information from at least one audio signal receiving apparatus 20, when the connection state management unit 161 acquires headphone cancellation information representing that the headphone function is canceled, the connection state management unit 161 determines the presence/absence of the audio signal receiving apparatus 20 the headphone function of which is valid (headphone output is set). When it is determined by the connection state management unit 161 that the audio signal receiving apparatus 20 the headphone function of which is valid is present, the audio output control unit 163 maintains an output stop state obtained by the external output unit 155 and an output state obtained by the headphone output unit 157, and controls the CH mapping information generating unit 165 not to change the CH mapping information. In this manner, in the audio signal transmitting apparatus 10 and the audio signal receiving apparatus 20 the headphone function of which is valid, the stop state of the external output and the output state obtained by the headphones are maintained.

With respect to (7), after the connection state management unit 161 acquires headphone information from at least one audio signal receiving apparatus 20, when the connection state management unit 161 acquires headphone cancellation information representing that the headphone function is canceled, the connection state management unit 161 determines the presence/absence of the audio signal receiving apparatus 20 the headphone function of which is valid (headphone output is set). When the audio output control unit 163 determines that the audio signal receiving apparatus 20 the headphone function of which is valid is absent by the connection state management unit 161, an output by the external output unit 155 is restarted, and an output by the headphone output unit 157 is stopped. In addition, the audio output control unit 163 controls the CH mapping information generating unit 165 to change the CH mapping information having an audio signal for a headphone output into CH mapping information having an audio signal for an external output. Furthermore, the audio output control unit 163 controls the connection management information transmitting unit 167 to transmit the changed CH mapping information to the audio signal receiving apparatus 20. In this manner, in the audio signal transmitting apparatus 10 and the audio signal receiving apparatus 20 the headphone function of which is valid, the external output is restarted, and the headphone output is stopped.

In the audio signal transmitting apparatus 10 according to the embodiment, transmission of an audio signal to the external connection apparatus and interactive communication with the external connection apparatus may be performed by wireless transmission or may be performed by wired transmission. However, the transmission and the communication are preferably performed by wireless transmission.

The function of the audio signal transmitting apparatus 10 according to the embodiment is described above. The constituent elements may be configured by using general-purpose members or may include hardware specialized for the functions of the constituent elements. All the functions of the constituent elements may be performed by a CPU or the like. Therefore, depending on a technological level obtained each time the embodiment is executed, configurations to be used can be arbitrarily changed.

(About Channel Mapping Information)

With reference to FIGS. 5A and 5B, channel mapping information generated by the audio signal transmitting apparatus 10 according to the embodiment will be described below in detail. FIGS. 5A and 5B are explanatory diagrams for explaining an example of the channel mapping information according to the embodiment.

The CH mapping information generated by the audio signal transmitting apparatus 10 according to the embodiment is regulated as a set of pieces of information representing types of audio signals allocated to a plurality of channels (CHs) which can transmit at least two stereo signals (in other words, at least 4-channel monaural signals), respectively.

FIGS. 5A and 5B show an example of CH mapping information allocated to the channels which can transmit four stereo signals (in other words, 8-channel monaural signals). In FIGS. 5A and 5B, as is apparent from these drawings, a frame which can cope with two monaural signals is arranged for one channel, and the types of a total of 8 audio signals are regulated.

In the audio signal transmitting apparatus 10 according to the embodiment, pieces of CH mapping information of two types, i.e., CH mapping information as shown in FIG. 5A and CH mapping information as shown in FIG. 5B can be generated.

In the CH mapping information shown in FIG. 5A, one pair of main channels are set to channel 1, and sub-channels corresponding to the main channels are set to channel 2 to channel 4. In this case, the main channel corresponds to a source of an audio signal corresponding to a main sound of, for example, a DVD, and the sub-channel means an audio signal corresponding to the main channel like a surround sound of a DVD.

To the sub-channels shown in FIG. 5A, for example, various sub-channels of signals such as an audio signal for subwoofer, an audio signal for center speaker, an audio signal for surround rear speaker, an audio signal for surround back speaker, and the like can be allocated. For example, a case in which as the audio signal receiving apparatus 20, a center speaker, a surround rear speaker, and a surround back speaker are connected to the audio signal transmitting apparatus 10, and sub-channels of the audio signal for center speaker, the audio signal for surround speaker, and an audio signal for surround back speaker, corresponding to the same contents as that of main contents, are allocated will be considered. In this case, the audio signal transmitting apparatus 10 outputs the audio signal of the main channel, and the audio signal receiving apparatus 20, i.e., the center speaker, the surround rear speaker, and the surround back speaker output audio signals of the corresponding sub-channels.

As shown in FIG. 5A, the CH mapping information including the channel to which the main channel is allocated and the channel to which the sub-channel is allocated is called CH mapping information of a "surround mode" hereinafter.

On the other hand, in CH mapping information shown in FIG. 5B, main channels are allocated to four channels, respectively, and a channel to which the sub-channel is allocated is not present. This corresponds to a case in which a CD sound source, a DVD sound source, a tuner sound source, and a digital input source are allocated to channel 1, channel 2, channel 3, and channel 4, respectively.

As shown in FIG. 5B, the CH mapping information in which main channels are allocated to the plurality of channels, respectively is called CH mapping information of a "multi-source mode" hereinafter.

The audio signal transmitting apparatus 10 can generate any one of the pieces of CH mapping information in a surround mode and a multi-source mode depending on the audio signal transmitting apparatus 10. Therefore, the audio signal transmitting apparatus 10 dedicated to the surround mode does need to be present, and the audio signal transmitting apparatus 10 dedicated to the multi-source mode may be present. The audio signal transmitting apparatus 10 capable of coping with both modes may be present.

When any channel of the CH mapping information is matched with an identification type allocated to the audio signal receiving apparatus, the audio signal receiving apparatus 20 according to the embodiment can output an audio signal allocated to the matched channel.

More specifically, when the identification type allocated to the audio signal receiving apparatus 20 is a "surround rear speaker", the audio signal receiving apparatus 20 can output an audio signal having a type "surround rear speaker" described in the CH mapping information.

In the embodiment, it is controlled by using the CH mapping information generated by the audio signal transmitting apparatus 10 whether an audio signal by the audio signal receiving apparatus 20 is externally output or output through the headphones. More specifically, for example, a type of an audio signal in the CH mapping information is changed from a "surround rear speaker" to a "surround rear headphone", so that an output by the surround rear speaker which is the audio signal receiving apparatus 20 can be controlled on the audio signal transmitting apparatus 10 side such that the output is changed from an external output through the loudspeakers to an output through the headphones. The details of the control will be described later.

(Functional Configuration of Audio Signal Receiving Apparatus 20)

Figure 6:
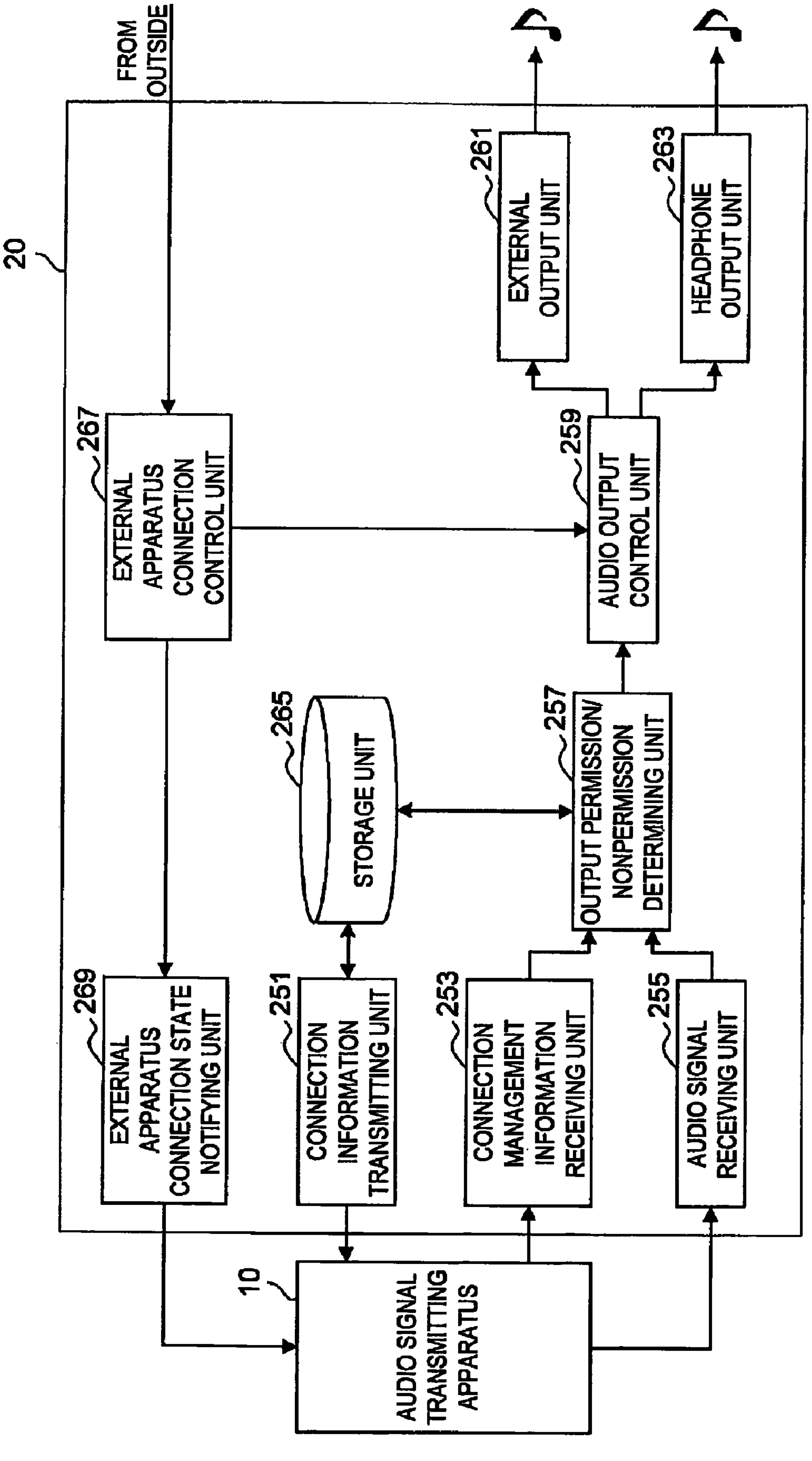
FIG. 6 is a block diagram showing a functional configuration of the audio signal receiving apparatus according to the embodiment.

Details of a functional configuration of the audio signal receiving apparatus 20 according to the embodiment realized by the hardware configuration is described above with reference to FIG. 6. FIG. 6 is a block diagram showing the functional configuration of the audio signal receiving apparatus 20 according to the embodiment.

As shown in FIG. 6, the audio signal receiving apparatus 20 includes a connection information transmitting unit 251, a connection management information receiving unit 253, an audio signal receiving unit 255, an output permission/nonpermission determining unit 257, an audio output control unit 259, an external output unit 261, a headphone output unit 263, a storage unit 265, an external apparatus connection control unit 267, and an external apparatus connection state notifying unit 269.

The connection information transmitting unit 251, for example, includes a CPU, a ROM, a RAM, an EEPROM, an external apparatus communication unit, and the like, and transmits connection information to change a connection state between the audio signal receiving apparatus 20 and the audio signal transmitting apparatus 10 to audio signal transmitting apparatus 10. In this case, as connection information to change connection states, for example, a connection establishment request of the audio signal receiving apparatus 20 to the audio signal transmitting apparatus 10, a connection cancellation request of the audio signal receiving apparatus 20 to the audio signal transmitting apparatus 10, information which notifies of an ON/OFF state of a power supply of the audio signal receiving apparatus 20, and the like can be given.

When the connection information transmitting unit 251 transmits the connection information to the audio signal transmitting apparatus 10, the connection information transmitting unit 251 may also transmit an identifier to specify the audio signal receiving apparatus 20.

The connection management information receiving unit 253, for example, includes a CPU, a ROM, a RAM, an EEPROM, an external apparatus communication unit, and the like, and receives the CH mapping information transmitted from the audio signal transmitting apparatus 10, information related to a type of the audio signal transmitting apparatus 10, a connection establishment notice or a connection cancellation notice notified by the audio signal transmitting apparatus 10, and the like. More specifically, the connection management information receiving unit 253 functions as a channel mapping information acquiring unit according to the embodiment. The received connection management information is transmitted to the output permission/nonpermission determining unit 257 (will be described later). The connection management information receiving unit 253 may record the received connection management information on the storage unit 265.

The audio signal receiving unit 255, for example, includes a CPU, a ROM, a RAM, an EEPROM, an external apparatus communication unit, and the like, and receives an audio signal received from the audio signal transmitting apparatus 10 in a communicable state. The audio signal receiving unit 255 outputs the received audio signal to the output permission/nonpermission determining unit 257 (will be described later). The audio signal receiving unit 255 may record the received audio signal on the storage unit 265.

The output permission/nonpermission determining unit 257, for example, includes a CPU, a ROM, a RAM, an EEPROM, and the like, and determines, on the basis of the CH mapping information received by the connection management information receiving unit 253, whether an audio signal which can be output by the audio signal receiving apparatus 20 itself is present in audio signals including a plurality of channels received by the audio signal receiving unit 255. In the determination, the output permission/nonpermission determining unit 257 may use identification information or the like of the audio signal receiving apparatus 20 itself stored in the storage unit 265 or the like.

When the audio signal which can be output is present as a result of the determination, the output permission/nonpermission determining unit 257 transmits the audio signal which can be output (for example, an audio signal which can be externally output through a loudspeaker or the like or an audio signal which can be output through headphones) to the audio output control unit 259 (will be described later).

The audio output control unit 259, for example, includes a CPU, a ROM, a RAM, an EEPROM, and the like, and performs output control of the external output unit 261 (will be described later) and the headphone output unit 263. More specifically, when the audio signals transmitted from the output permission/nonpermission determining unit 257 include an audio signal which can be externally output, the audio output control unit 259 transmits the audio signal to the external output unit 261. When the audio signals transmitted from the output permission/nonpermission determining unit 257 include an audio signal which can be output through the headphones, the audio output control unit 259 transmits the audio signal to the headphone output unit 263. In this manner, depending on the signal included in the audio signals transmitted from the output permission/nonpermission determining unit 257, the audio output control unit 259 can control an output of the audio signal in the audio signal receiving apparatus 20.

The external output unit 261, for example, includes a DA converter, an amplifier, a loudspeaker, and the like, and outputs an audio signal which is transmitted from the audio output control unit 259 and can be externally output to the outside of the audio signal transmitting apparatus 10.

The headphone output unit 263, for example, is connected to an audio signal acquiring apparatus such as headphones connected to the audio signal transmitting apparatus 10 by wired connection or wireless connection, and outputs a headphone output which is transmitted from the audio output control unit 259 and can be output through the headphones to the audio signal acquiring apparatus.

In the storage unit 265, for example, a database on which a type or the like of an audio signal configuring CH mapping information is recorded, various pieces of information which can be transmitted to the audio signal transmitting apparatus 10, various programs and processing methods used by the audio signal receiving apparatus 20 according to the embodiment are stored.

Furthermore, the storage unit 265 can appropriately store various parameters, intermediate steps of processing which need to be stored, in addition to the database and the programs, when the audio signal transmitting apparatus 10 performs any process. In the storage unit 265, processing units such as the connection information transmitting unit 251, the connection management information receiving unit 253, the audio signal receiving unit 255, the output permission/nonpermission determining unit 257, the audio output control unit 259, and the external apparatus connection state notifying unit 269 which configure the audio signal receiving apparatus 20 can freely write data.

The external apparatus connection control unit 267, for example, includes a CPU, a ROM, a RAM, an EEPROM, and the like, and determines whether an external connection apparatus is further connected to the audio signal receiving apparatus 20. In this case, the external connection apparatus connected to the audio signal receiving apparatus 20 may be directly connected to an external apparatus connection terminal arranged on the audio signal receiving apparatus 20 or wirelessly connected to the audio signal receiving apparatus 20 through a wireless system or the like. As the external connection apparatus connected to the audio signal receiving apparatus 20, another audio signal receiving apparatus 20 may be used, or an audio signal acquiring apparatus such as headphones or an earphone may be used.

When a new external connection apparatus is connected to the audio signal receiving apparatus 20, the external apparatus connection control unit 267 notifies the external apparatus connection state notifying unit 269 (will be described later) that the new external apparatus is connected, and the external apparatus connection state notifying unit 269 transmits the effect that the external connection apparatus is further connected to the audio signal transmitting apparatus 10. On the other hand, when the connection of the connected external apparatus is canceled, the external apparatus connection control unit 267 notifies the external apparatus connection state notifying unit 269 of the effect that the connection of the external apparatus is canceled, and the external apparatus connection state notifying unit 269 transmits the effect that the connection of the external apparatus is canceled to the audio signal transmitting apparatus 10.

In particular, when headphones are connected as an external apparatus, the external apparatus connection control unit 267 according to the embodiment transmits headphone information representing that headphones are connected and an output of an audio signal is a headphone output (the effect that a headphone function is valid) to the audio signal transmitting apparatus 10 through the external apparatus connection state notifying unit 269. When the connection of the connected headphones is canceled, the external apparatus connection control unit 267 transmits headphone cancellation information representing that the connection of the headphones is canceled and the output of the audio signal is changed from the headphone output into the external output (the effect that the headphone function is canceled) to the audio signal transmitting apparatus 10 through the external apparatus connection state notifying unit 269.

The external apparatus connection control unit 267 transmits information (for example, headphone information, headphone cancellation information, and the like) related to a connection state of an external apparatus to the audio output control unit 259. For this reason, when the headphone function of the audio signal receiving apparatus 20 becomes valid, the audio output control unit 259 can control the external output unit 261 to stop an output from the external output unit 261. On the other hand, when the headphone function of the audio signal receiving apparatus 20 is canceled, the audio output control unit 259 can control the headphone output unit 263 to stop an output from the headphone output unit 263.

The external apparatus connection state notifying unit 269, for example, includes a CPU, a ROM, a RAM, an EEPROM, an external apparatus communication unit, and the like, and notifies the audio signal transmitting apparatus 10 of information (for example, headphone information, headphone cancellation information, and the like) related to a connection state of the external apparatus transmitted from the external apparatus connection control unit 267. More specifically, the external apparatus connection state notifying unit 269 functions as a headphone signal transmission unit according to the embodiment. The information related to the connection state of the external apparatus is transmitted to the audio signal transmitting apparatus 10, so that the audio signal transmitting apparatus 10 can recognize the connection state of the external apparatus in the audio signal receiving apparatus 20.

In this case, when the audio signal receiving apparatus 20 is a apparatus such as headphones which can be wirelessly connected, the external output unit 261 is not arranged, and the external apparatus connection control unit 267 does not need to be also arranged. In this case, the audio signal receiving apparatus 20 typically performs a headphone output by using the headphone output unit 263. Therefore, the external apparatus connection state notifying unit 269 may transmit headphone information when, for example, the connection information transmitting unit 251 transmits a connection request to the audio signal transmitting apparatus 10.

In the audio signal receiving apparatus 20 according to the embodiment, reception of an audio signal transmitted from the audio signal transmitting apparatus 10 and interactive communication with the audio signal transmitting apparatus 10 may be performed by wireless transmission or wired transmission. However, the reception and the communication are preferably performed by wireless transmission.

An example of the function of the audio signal receiving apparatus 20 according to the embodiment has been described above. The constituent elements may be configured by using general-purpose members or may include hardware specialized for the functions of the constituent elements. All the functions of the constituent elements may be performed by a CPU or the like. Therefore, depending on a technological level obtained each time the embodiment is executed, configurations to be used can be arbitrarily changed.

(Connecting Process of Audio Signal Receiving Apparatus)

Figure 7:
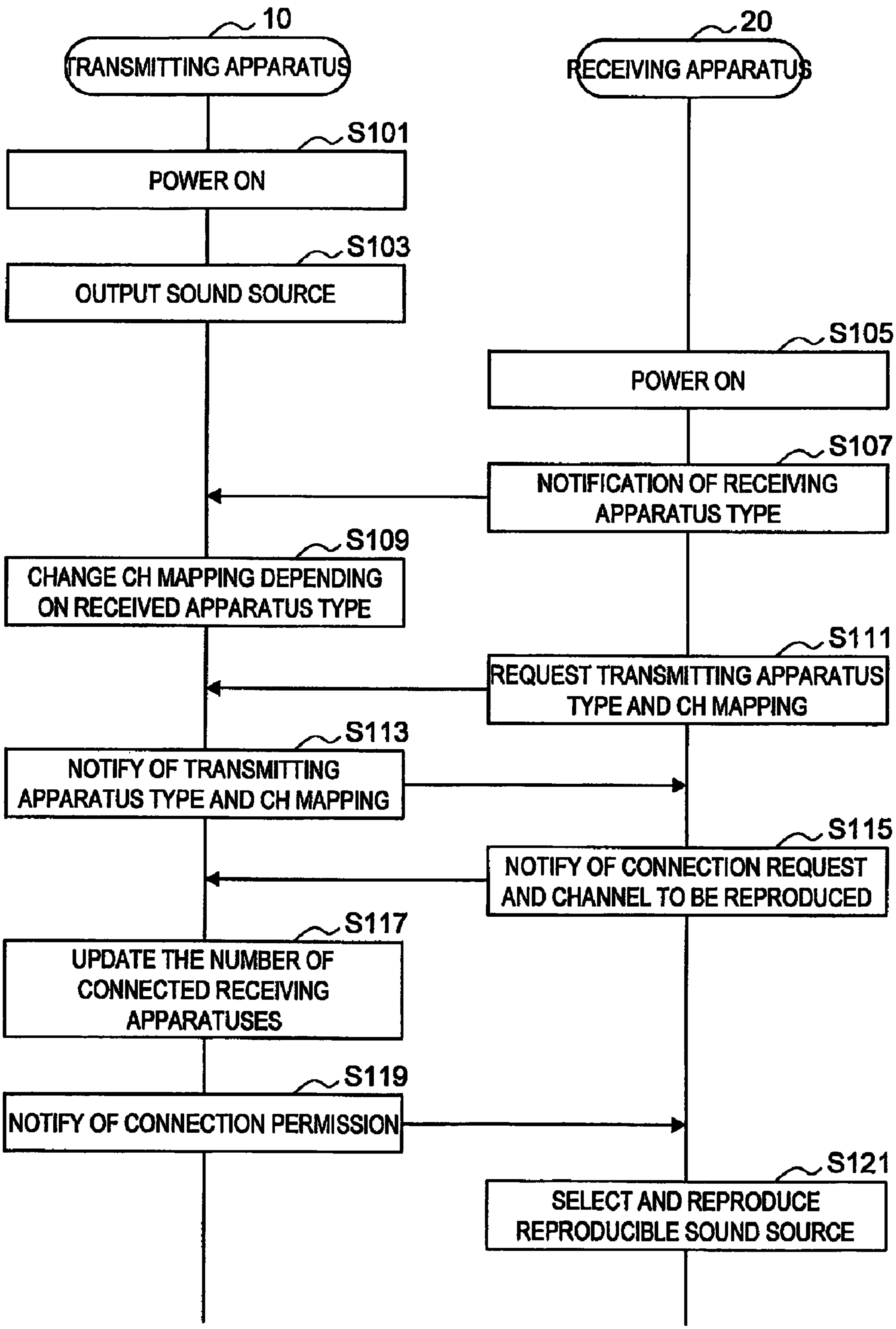
FIG. 7 is a flow chart showing a flow of connection processes of the audio signal receiving apparatus according to the embodiment.

Subsequently, with reference to FIG. 7, a connecting process of the audio signal receiving apparatus 20 to the audio signal transmitting apparatus 10 will be described below in detail. FIG. 7 is a flow chart showing a flow of the connecting process of the audio signal receiving apparatus according to the embodiment.

When the power supply of the audio signal transmitting apparatus 10 is turned on by a user (step S101), the audio signal transmitting apparatus 10 starts an output of a sound source through the audio signal output unit arranged in the audio signal transmitting apparatus 10 (step S103).

At a certain point of time, when the power supply of the audio signal receiving apparatus 20 is turned on by a user (step S105), the audio signal receiving apparatus 20, with reference to the storage unit 265 or the like, notifies the audio signal transmitting apparatus 10 of a receiving apparatus type (for example, an apparatus (surround amplifier or loudspeaker) which needs CH mapping information of a surround mode, an apparatus which needs CH mapping information of a multi-source mode, or the like) through the connection information transmitting unit 251 (step S107).

In the audio signal transmitting apparatus 10, the connection state management unit 161 receives a receiving apparatus type notice from the audio signal receiving apparatus 20. The connection state management unit 161 determines that the audio signal receiving apparatus 20 can be connected to the audio signal transmitting apparatus 10. In the CH mapping information generating unit 165, new CH mapping information is generated (step S109).

The audio signal receiving apparatus 20 notifies the audio signal transmitting apparatus 10 of a type of the audio signal transmitting apparatus 10 (for example, an apparatus which allows the CH mapping information of the surround mode, an apparatus which allows the CH mapping information of the multi-source mode, or the like) and an acquiring request of CH mapping information used by the audio signal transmitting apparatus 10 at the present (step S111).

When the connection state management unit 161 of the audio signal transmitting apparatus 10 receives the acquiring request, the connection management information transmitting unit 167 transmits a type of the transmitting apparatus 10 and CH mapping information to the audio signal receiving apparatus 20 (step S113).

The audio signal receiving apparatus 20 which receives the type of the transmitting apparatus 10 and the CH mapping information notifies the audio signal transmitting apparatus 10 of a connection establishment request to the audio signal transmitting apparatus 10 and a channel to be desirably reproduced (step S115).

In the audio signal transmitting apparatus 10 which receives the connection establishment request from the audio signal receiving apparatus 20, the number of audio signal receiving apparatuses 20 the connections of which are established in the connection state management unit 161 updates (step S117). The audio signal transmitting apparatus 10 notifies the audio signal receiving apparatus 20 of the effect (connection establishment notice) that the connection is permitted (step S119).

In the audio signal receiving apparatus 20 which establishes a connection to the audio signal transmitting apparatus 10, a reproducible sound source is selected to reproduce an audio signal (step S121).

By the procedures described above, the audio signal receiving apparatus 20 is connected to the audio signal transmitting apparatus 10. In the connecting process according to the embodiment, since the audio signal receiving apparatus 20 starts the connecting process to the audio signal transmitting apparatus 10 the moment the power supply is turned on without waiting for an operation by a user, a user of the audio signal receiving apparatus 20 can easily perform connection to the audio signal transmitting apparatus 10.

(Connection Confirming Process of Audio Signal Transmitting Apparatus)

Figure 8:
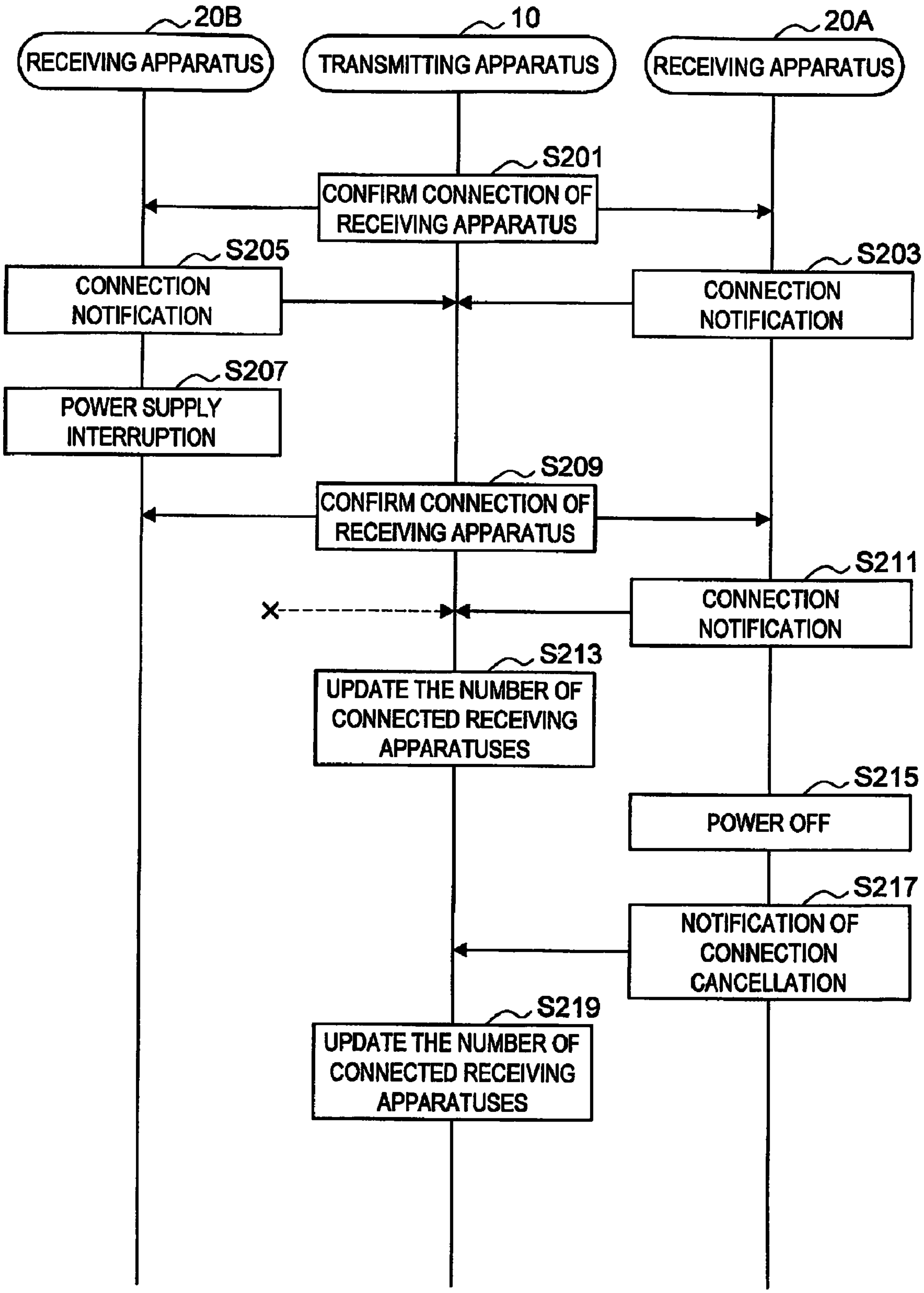
FIG. 8 is a flow chart showing a flow of connection confirming processes executed by an audio signal transmitting apparatus 10 according to the embodiment.

A connection confirming process of the audio signal receiving apparatus 20 which is executed by the audio signal transmitting apparatus 10 will be described below in detail with reference to FIG. 8. FIG. 8 is a flow chart showing a flow of the connection confirming process executed by the audio signal transmitting apparatus 10 according to the embodiment.

The audio signal transmitting apparatus 10, as described above, performs connection confirmation to the audio signal receiving apparatus 20 at predetermined intervals, and determines whether the connection to the audio signal receiving apparatus 20 is maintained. The connection confirming process will be described below in detail. In the following explanation, it is assumed that the audio signal receiving apparatuses 20A and 20B are connected to the audio signal transmitting apparatus 10.

The connection state management unit 161 of the audio signal transmitting apparatus 10 transmits operation state confirming signals to confirm the operation states of the audio signal receiving apparatuses 20A and 20B to the connected audio signal receiving apparatuses 20A and 20B (step S201). The audio signal receiving apparatuses 20A and 20B which receive the operation state confirming signals respond to the received operation state confirming signals to notify that the audio signal receiving apparatuses 20A and 20B are connected (step S203 and S205).

When the audio signal transmitting apparatus 10 receives the response from the audio signal receiving apparatus 20, the audio signal transmitting apparatus 10 performs a process of maintaining a connection state. For this reason, the connection state management unit 161 do not change the connection state, and the CH mapping information generating unit 165 does not generate new CH mapping information.

In this state, it is considered that, at a certain point of time, a power supplied to the audio signal receiving apparatus 20B is interrupted (step S207) to turn off the power supply of the audio signal receiving apparatus 20B.

A predetermined period of time (for example, about 1 minute) has elapsed after a previous operation state confirming signal is transmitted (in FIG. 8, a point of time of step S201), the audio signal transmitting apparatus 10 transmits the next operation state confirming signal to confirm the connections of the audio signal receiving apparatuses 20A and 20B (step S209).

In this case, a connection notice is returned from the audio signal receiving apparatus 20A (step S211). However, a connection notice is not returned from the audio signal receiving apparatus 20B the power supply of which is interrupted to be turned off.

In the audio signal transmitting apparatus 10, since there is no response from the audio signal receiving apparatus 20B the connection relationship of which is maintained at the previous confirmation, the connection to the audio signal receiving apparatus 20B is canceled, and the connection state management unit 161 updates the number of audio signal receiving apparatus in connection states (step S213).

Thereafter, the power supply is turned off through authentic processes by the user of the audio signal receiving apparatus 20A (step S215), the audio signal receiving apparatus 20A transmits a connection cancellation notice from the connection information transmitting unit 251 to the audio signal transmitting apparatus 10 as part of the shutdown process (step S217), and the power supply of the audio signal receiving apparatus 20A is turned off.

In the audio signal transmitting apparatus 10, in response to the connection cancellation notice from the audio signal receiving apparatus 20A, the audio signal transmitting apparatus 10 cancels the connection with the audio signal receiving apparatus 20A, and the connection state management unit 161 updates the number of audio signal receiving apparatuses in connection states (step S219).

In the audio signal transmission system 1 according to the embodiment, since the processes are automatically performed at predetermined time intervals, maintenance or cancellation of connection between the audio signal transmitting apparatus 10 and the audio signal receiving apparatus 20 can be automatically processed.

(Change of Channel Mapping Information)

Subsequently, with reference to FIGS. 9A to 9D, a change of channel mapping information in the audio signal transmission system 1 according to the embodiment will be described below. FIGS. 9A to 9D are explanatory diagrams for explaining an example of channel mapping information according to the embodiment.

CH mapping information shown in FIG. 9A is CH mapping information in a "surround mode". It is assumed that an audio signal is transmitted to the audio signal receiving apparatus 20 on the basis of the CH mapping information.

In this case, when the headphones are connected to the audio signal receiving apparatus 20 by wired connection or wireless connection, the external apparatus connection control unit 267 of the audio signal receiving apparatus 20 transmits the effect that the headphones are connected to the audio signal receiving apparatus 20 to the external apparatus connection state notifying unit 269. In response to the transmission, the external apparatus connection state notifying unit 269 transmits, to the audio signal transmitting apparatus 10, the effect (headphone information) that the headphones are connected to the audio signal receiving apparatus 20. When the audio signal transmitting apparatus 10 receives the effect (headphone information) that the audio signal output state of the audio signal receiving apparatus 20 is changed by the connection of the headphones, the connection state management unit 161 updates the connection state, and the CH mapping information generating unit 165 generate new CH mapping information as shown in FIG. 9B.

FIG. 9B is an example of CH mapping information newly generated when the headphones are attached to the surround rear speaker serving as the audio signal receiving apparatus 20. As is apparent from the comparison between FIGS. 9A and 9B, a "surround rear (L)" and a "surround rear (R)" allocated to channel 2 in FIG. 9A are changed into a "surround rear headphone (L)" and a "surround rear headphone (R)" in FIG. 9B, respectively. In this manner, in the audio signal transmission system 1 according to the embodiment, a new external connection apparatus is connected to the audio signal receiving apparatus 20, the CH mapping information is automatically changed in the audio signal transmitting apparatus 10.

FIG. 9C shows an example of CH mapping information newly formed when the surround back speaker serving as the audio signal receiving apparatus 20 is further connected to the audio signal transmitting apparatus 10 in the case in FIG. 9B. As is apparent from comparison between FIGS. 9B and 9C, a "surround back (L)" and a "surround back (R)" allocated to channel 3 in FIG. 9B are changed into a "surround back headphone (L)" and a "surround back headphone (R)" in FIG. 9C, respectively.

In this case, since the headphones are connected to the surround rear speaker, the surround back speaker arranged in the same space (for example, the same room) need to be prevented from externally outputting the signal. Therefore, the CH mapping information generating unit 165 controlled by the audio output control unit 163 changes an audio signal for surround back speaker into an audio signal for headphone output regardless of whether the headphones are connected to the surround back speaker. In this manner, the CH mapping information is changed, the surround back speaker which receives the CH mapping information from the audio signal transmitting apparatus 10 is controlled not to externally output the signal. When the headphones are newly connected to the surround back speaker, the surround back speaker can automatically output the audio signal for headphone output through the headphones on the basis of the CH mapping information.

The CH mapping information generating unit 165 may form the CH mapping information shown in FIG. 9C when the headphones are connected to the surround rear speaker. In this manner, before the headphones are attached to the surround rear speaker, an external output by the surround back speaker is automatically stopped not only when the surround back speaker is connected but also when a new surround back speaker is connected, and a headphone output by the surround back speaker is automatically started.

FIG. 9D shows an example of CH mapping information newly formed when connection of the surround rear speaker is newly canceled in the case in FIG. 9C. As is apparent from comparison between FIGS. 9C and 9D, the "surround rear headphone (L)" and the "surround rear headphone (R)" allocated to channel 2 in FIG. 9C are changed into the "surround rear (L)" and the "surround rear (R)" in FIG. 9B, respectively.

In this case, since connection of the surround rear speaker to the audio signal transmitting apparatus 10 is canceled, an audio signal is not externally output from the surround speaker. Therefore, the audio signal for headphone output can be changed into an audio signal for external output without any issue. However, thereafter, the headphones may be connected to the surround rear speaker again, the CH mapping information generating unit 165 does not need to change the CH mapping information into the CH mapping information as shown in FIG. 9D. Furthermore, channel 2 may be changed into an unused channel to effectively use channel 2 as another source.

In addition to the above case, for example, when a user of the audio signal receiving apparatus 20 requests to change an output audio signal through the key operation unit 211, when the user of the audio signal receiving apparatus 20 requests to change the type of the audio signal transmitting apparatus 10 from a "surround mode" to a "multi-source mode", or when the type of the connected audio signal receiving apparatus 20 is changed (for example, a apparatus (surround amplifier or speaker) which needs CH mapping information of the surround mode is changed into a apparatus which needs CH mapping information of the multi-source mode), the CH mapping information is changed.

(Changing Process of Channel Mapping Information)

Figure 10:
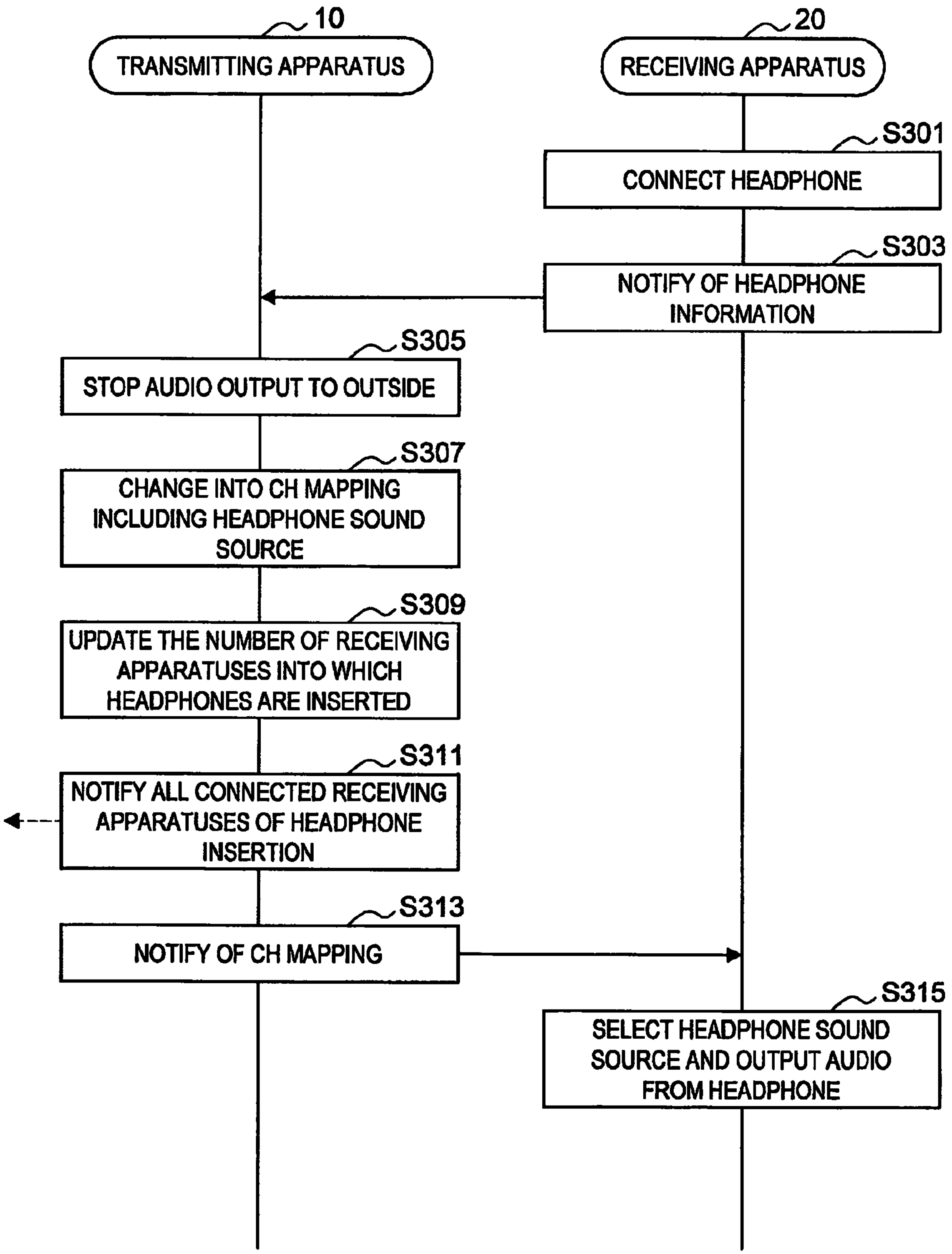
FIG. 10 is a flow chart showing an example of a channel mapping information changing process in the audio signal transmission system according to the embodiment.

Subsequently, with reference to FIG. 10, a changing process of channel mapping information according to the embodiment will be described in detail by using an example in which headphones are attached to the audio signal receiving apparatus 20. FIG. 10 is a flow chart showing an example of a changing process of channel mapping information in the audio signal transmission system according to the embodiment.

When the headphones are connected to the audio signal receiving apparatus 20 (step S301), the audio signal receiving apparatus 20 transmits a notice of headphone information to the audio signal transmitting apparatus 10 through the external apparatus connection control unit 267 and the external apparatus connection state notifying unit 269 (step S303).

In the audio signal transmitting apparatus 10, when the notice is received, an audio output to the outside of the audio signal transmitting apparatus 10 is stopped (step S305), the CH mapping information generating unit 165 changes the CH mapping information into CH mapping including a sound source for headphone (step S307). Subsequently, the connection state management unit 161 of the audio signal transmitting apparatus 10 updates the number of audio signal receiving apparatuses 20 to which the headphones are connected (step S309) and notifies all the audio signal receiving apparatuses 20 connected to the audio signal transmitting apparatus 10 that the headphones are connected (step S311). The audio signal transmitting apparatus 10 notifies the audio signal receiving apparatuses 20 of the changed CH mapping information (step S313).

The audio signal receiving apparatus 20 receives the new CH mapping information, selects a headphone sound source from the CH mapping information, and outputs sound from the connected headphones (step S315).

As described above, in the audio signal transmission system according to the embodiment, since a predetermined event caused by attaching the headphones, changing the audio signal receiving apparatus itself, changing an audio source to be reproduced, or the like is shared by the audio signal transmitting apparatus and the audio signal receiving apparatus, even though any one of the transmitting apparatus and the receiving apparatus is operated, the same processing result as in the operated apparatus can be obtained even in the unoperated apparatus.

The audio signal receiving apparatus requests the audio signal transmitting apparatus to perform a process corresponding to the predetermined event occurring in the audio signal receiving apparatus to make it possible to reduce the process performed by the audio signal receiving apparatus.

In particular, in the audio signal transmission system according to the embodiment, as will be described below in detail, with an operation such as attachment of the headphones performed in one audio signal receiving apparatus, an audio output in the audio signal transmitting apparatus or another audio signal receiving apparatus can be appropriately controlled.

(Flow of Audio Output Control Process)

Figure 11:
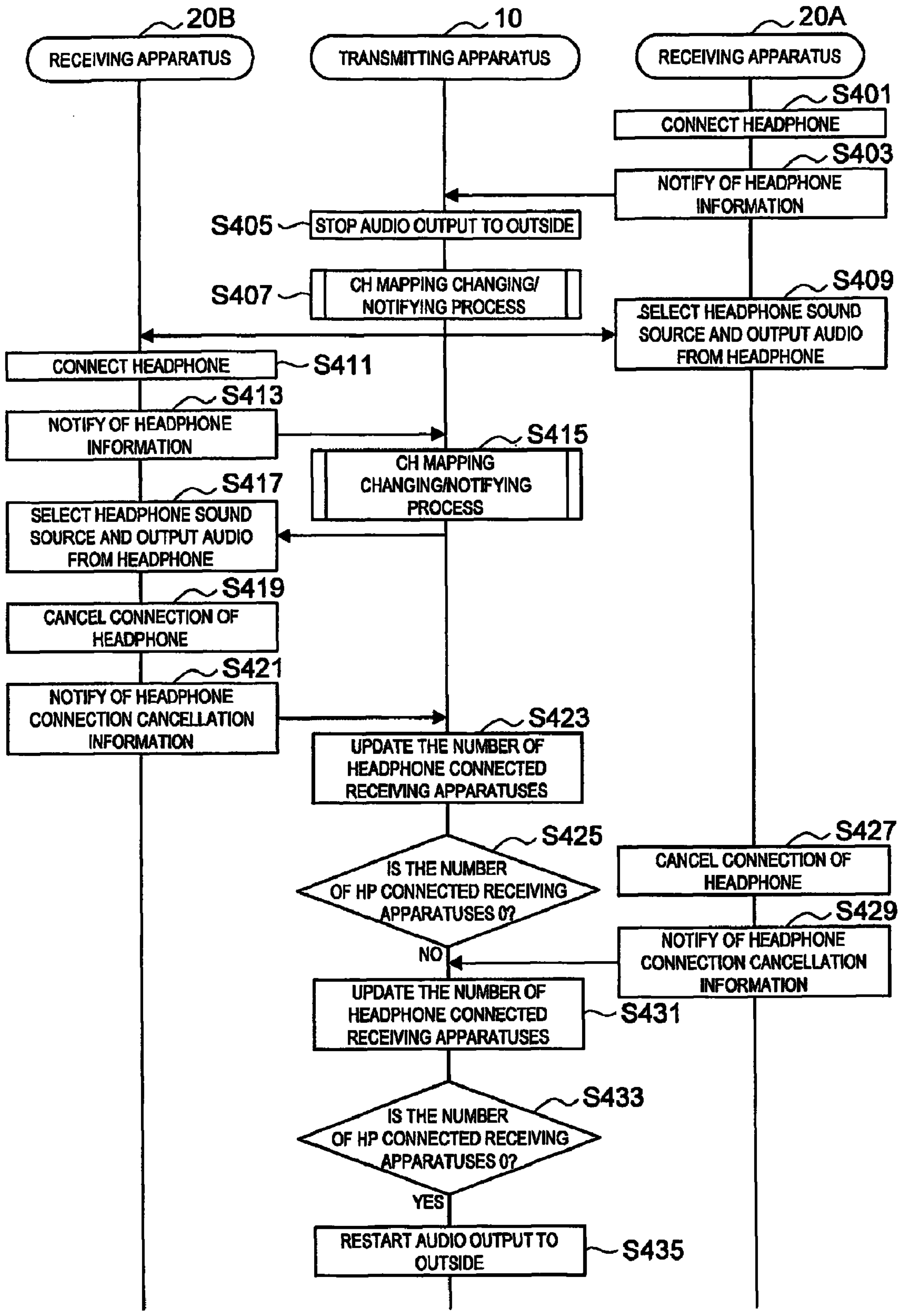
FIG. 11 is a flow chart showing an example of an audio output control process in the audio signal transmission system according to the embodiment.

With reference to FIG. 11, an audio output control process in the audio signal transmission system according to the embodiment will be described below in detail by using an example in which headphones are attached to or detached from the two audio signal receiving apparatuses 20A and 20B. FIG. 11 is a flow chart showing an example of the audio output control process in the audio signal transmission system according to the embodiment.

When the headphones are connected to the audio signal receiving apparatus 20A (S401), the audio signal receiving apparatus 20A transmits a notice of headphone information to the audio signal transmitting apparatus 10 through the external apparatus connection control unit 267 and the external apparatus connection state notifying unit 269 (step S403).

In the audio signal transmitting apparatus 10, when this notice is received, an audio output to the outside of the audio signal transmitting apparatus 10 is stopped (step S405). In addition, in the audio signal transmitting apparatus 10, the CH mapping information is changed into CH mapping including a sound source for headphone by the CH mapping information generating unit 165. Subsequently, the connection state management unit 161 of the audio signal transmitting apparatus 10 updates the number of audio signal receiving apparatuses to which the headphones are connected, and notifies of all the audio signal receiving apparatuses 20 connected to the audio signal transmitting apparatus 10 that the headphones are connected. However, the notification of connection of the headphones is performed in the embodiment such that the audio signal transmitting apparatus 10 transmits channel mapping information changed by allocating an audio signal for headphone output to the audio signal receiving apparatuses 20A and 20B. In this manner, all the audio signal receiving apparatuses 20A and 20B connected to the audio signal transmitting apparatus 10 acquire the changed channel mapping information, and the audio signal receiving apparatuses 20A and 20B perform an audio output according to the changed channel mapping to make it possible to automatically stop an external output and switch the external output to the headphone output (external audio output is muted).

The audio signal transmitting apparatus 10 notifies all the audio signal receiving apparatuses 20A and 20B which are being connected to the audio signal transmitting apparatus 10 of the changed CH mapping information. FIG. 11 shows all the above processes (processes corresponding to steps S307 to S313 in FIG. 10) as "CH mapping changing/notifying process".

The audio signal receiving apparatus 20A receives new CH mapping information, selects a headphone sound source from the CH mapping information, and outputs sound from the connected headphones (step S409).

In the connection state described above, when the headphones are connected to the audio signal receiving apparatus 20B (S411), the audio signal receiving apparatus 20B transmits a notice of headphone information to the audio signal transmitting apparatus 10 through the external apparatus connection control unit 267 and the external apparatus connection state notifying unit 269 (step S413).

In the audio signal transmitting apparatus 10, when the notice is received, the CH mapping changing/notifying process is performed (S415).

The audio signal receiving apparatus 20B receives new CH mapping information, selects a headphone sound source from the CH mapping information, and outputs a sound from the connection headphones (step S417).

In the connection state described above, when the connection of the headphones is canceled from the audio signal receiving apparatus 20B (S419), and the audio signal receiving apparatuses 20A and 20B transmits a notice of headphone cancellation information to the audio signal transmitting apparatus 10 through the external apparatus connection control unit 267 and the external apparatus connection state notifying unit 269 (step S421).

In the audio signal transmitting apparatus 10, when the notice is received, the connection state management unit 161 updates the number of audio signal receiving apparatuses 20 to which the headphones are connected (S423: in this example, the number of audio signal receiving apparatuses 20 is reduced by one), and determines whether the number of audio signal receiving apparatuses 20 to which the headphones are connected is 0 (zero) (S425). As a result of the determination, it is determined that the number of audio signal receiving apparatuses 20 to which the headphones are connected is not 0 (zero) (in this example, the headphones are connected to the audio signal receiving apparatus 20A), the audio output control unit 163 performs control to maintain a state in which an external audio output is stopped.

Furthermore, in the connection state, when the connection of the headphones is canceled from the audio signal receiving apparatus 20A (S427), the audio signal receiving apparatus 20A transmits a notice of headphone cancellation information to the audio signal transmitting apparatus 10 through the external apparatus connection control unit 267 and the external apparatus connection state notifying unit 269 (step S429).

In the audio signal transmitting apparatus 10, when the notice is received, the connection state management unit 161 updates the number of audio signal receiving apparatuses 20 to which the headphones are connected (S431: in this example, the number of audio signal receiving apparatuses 20 is reduced by one), and determines whether the number of audio signal receiving apparatuses 20 to which the headphones are connected is 0 (zero) (S433). As a result of the determination, it is determined that the number of audio signal receiving apparatuses 20 to which the headphones are connected is 0 (zero) (in this example, the connects of the headphones are canceled in both the audio signal receiving apparatus 20A and the audio signal receiving apparatus 20B), and the audio output control unit 163 performs control to restart an external audio output (S435).

As described above, when the number of audio signal receiving apparatuses 20 to which the headphones are connected becomes 0, after the external audio output is restarted in the audio signal transmitting apparatus 10, in the audio signal transmitting apparatus 10, the CH mapping information may be changed by the CH mapping information generating unit 165 into CH mapping including a sound source for external output realized by a loudspeaker. Furthermore, the audio signal transmitting apparatus 10 may notify all the audio signal receiving apparatuses 20 connected to the audio signal transmitting apparatus 10 of the changed CH mapping information.

As described above, in the audio signal transmission system according to the embodiment, with operations such as attachment and detachment of the headphones performed in one audio signal receiving apparatus (for example, one of the audio signal receiving apparatus 20A and the audio signal receiving apparatus 20B), audio outputs in the audio signal transmitting apparatus 10 and the other audio signal receiving apparatus (for example, the other of the audio signal receiving apparatus 20A and the audio signal receiving apparatus 20B) can be appropriately controlled.

[First Modification]

An audio signal transmitting apparatus according to a first modification of the first embodiment of the present invention will be described below with a focus on a difference between the audio signal transmitting apparatus and the audio signal transmitting apparatus 10 according to the first embodiment described above.

In the audio signal transmitting apparatus 10 according to the first embodiment described above, when headphone information is received from at least one audio signal receiving apparatus 20 of audio signal receiving apparatuses 20 serving as external connection apparatuses which receive audio signals from an audio signal transmitting unit 159, output control of the audio signals of the audio signal receiving apparatus 20 and the other audio signal receiving apparatus 20 is performed by changing CH mapping information.

In contrast to this, in the audio signal transmitting apparatus according to the first modification, with respect to each of the external connection apparatuses which can communicate with the audio signal transmitting apparatus, it is determined whether an external output of the audio signal needs to be stopped. Depending on a result of the determination, a mute signal which directs to stop an external output of the audio signal is transmitted to the external connection apparatus.

More specifically, the audio signal transmitting apparatus according to the first modification includes, in place of the CH mapping information generating unit 165 according to the first embodiment, an output permission/nonpermission determining unit (not shown) and a mute signal transmitting unit (not shown).

The output permission/nonpermission determining unit, with respect to each of the external connection apparatuses which can communicate with the audio signal transmitting apparatus, determines whether an external output of an audio signal needs to be stopped depending on a type of an audio signal which can be output by the external connection apparatus.

The mute signal transmitting unit transmits a mute signal to direct to stop an external output of an audio signal to the external connection apparatuses which can communicate with the audio signal transmitting apparatus depending on the determination of the output permission/nonpermission determining unit.

The audio output control unit of the audio signal transmitting apparatus according to the first modification can control the mute signal transmitting unit to transmit a mute signal to the external connection apparatus in which it is determined by the output permission/nonpermission determining unit that the external output of the audio signal needs to be stopped. An audio output control unit of the audio signal transmitting apparatus according to the first modification can control the mute signal transmitting unit not to transmit a mute signal to the external connection apparatus in which it is determined by the output permission/nonpermission determining unit that the external output of the audio signal needs not be stopped.

[Second Modification]

An audio signal transmitting apparatus according to a second modification of the first embodiment of the present invention will be described below with a focus on a difference between the audio signal transmitting apparatus and the audio signal transmitting apparatus 10 according to the first embodiment described above.

In the audio signal transmitting apparatus 10 according to the first embodiment described above, when headphone information is received from at least one audio signal receiving apparatus 20 of audio signal receiving apparatuses 20 serving as external connection apparatuses which receive audio signals from an audio signal transmitting unit 159, output control of the audio signals of the audio signal receiving apparatus 20 and the other audio signal receiving apparatus 20 is performed by changing CH mapping information.

In contrast to this, the audio signal transmitting apparatus according to the second modification includes, in place of the CH mapping information generating unit 165 according to the first embodiment, a mute signal transmitting unit which transmits a mute signal to direct to stop an external output of an audio signal. An audio output control unit according to the second modification can control the mute signal transmitting unit to transmit a mute signal to an external connection apparatus which externally outputs an audio signal transmitted through a specific channel in audio signals including a plurality of channels and transmitted to the audio signal receiving apparatus.

As described above, in the first modification and the second modification, output control in the audio signal receiving apparatus by the audio signal transmitting apparatus is performed by transmitting the mute signal without depending on CH mapping information. An audio signal receiving apparatus serving as a destination of the transmitted mute signal is determined by checking whether an external output needs to be stopped depending on the type of an audio signal which can be output by the external connection apparatus in the first modification, and is determined by designating a channel in which an external output is stopped in the second modification.

In any one of the first modification and the second modification, the audio output control unit of the audio signal transmitting apparatus can only the stop of the external output and can hardly control the start of a headphone output. From this point of view, the audio signal transmitting apparatus 10 according to the first embodiment described above is preferable more than the audio signal transmitting apparatuses according to the first and second modifications.

It should be understood by those skilled in the art that various modifications, combinations, sub-combinations and alterations may occur depending on design requirements and other factors insofar as they are within the scope of the appended claims or the equivalents thereof.

For example, the embodiments described above describe the case in which a 4-channel stereo system including 4 channels is used. However, the number of channels is not limited to the number described above, and 4 or more channels may be used. Since the number of settable channels depends on the processing capability of a CPU or a DSP arranged in the audio signal transmitting apparatus or the audio signal receiving apparatus, the numbers of channels can be changed depending on the processing capabilities of these processors.

What is claimed is:

1. An audio signal transmitting apparatus adapted to communicate with a plurality of external connection apparatuses and transmit audio signals to the plurality of external connection apparatuses, comprising:

an external output unit to output the audio signal to the outside;

an audio signal transmitting unit to transmit the audio signal to the plurality of external connection apparatus being in a communicable state; and an audio output control unit to perform, when headphone information representing validity of a headphone function that outputs the audio signal through headphones is received from at least one of the external connection apparatuses which receive the audio signals, control to stop an output by the external output unit.

2. The audio signal transmitting apparatus according to claim 1, wherein the audio output control unit is further adapted to perform control to stop an external output of an audio signal received by the at least one of the external connection apparatuses.

3. The audio signal transmitting apparatus according to claim 2, wherein the audio output control unit, when a second external connection apparatus other than the at least one of the external connection apparatuses is in a communicable state, performs control to stop an external output of the audio signal received by the second external connection apparatus.

4. The audio signal transmitting apparatus according to claim 3, wherein the audio output control unit is further adapted to perform control to make the headphone function of the second external connection apparatus valid.

5. The audio signal transmitting apparatus according to claim 1, wherein the audio output control unit performs control to make the headphone function of the audio signal transmitting apparatus valid.

6. The audio signal transmitting apparatus according to claim 1, further comprising:

a channel mapping information generating unit to change, when the headphone information is received from the at least one of the external connection apparatuses, channel mapping information representing each of types of the audio signals transmitted through a plurality of channels into information including a type of the audio signal which can be output from an external connection apparatus having a valid headphone function, wherein the audio signal transmitting unit transmits the audio signals to the external connection apparatuses through the plurality of channels.

7. The audio signal transmitting apparatus according to claim 6, further comprising a channel mapping information providing unit to provide the channel mapping information changed by the channel mapping information generating unit to at least one of the external connection apparatuses which transmits the headphone information.

8. The audio signal transmitting apparatus according to claim 7, wherein the audio output control unit controls the external connection apparatus which acquires the changed channel mapping information from the channel mapping information providing unit to stop an external output of the audio signal received by the at least one of the external connection apparatuses.

9. The audio signal transmitting apparatus according to claim 8, wherein the audio output control unit controls at least a second external connection apparatus which does not acquire the changed channel mapping information from the channel mapping information providing unit to maintain an external output of the audio signal received by the external connection apparatus.

10. The audio signal transmitting apparatus according to claim 1, further comprising:

an output permission/nonpermission determining unit to determine, when the headphone information is received from the at least one of the external connection apparatuses, whether an external output of the audio signal is to be stopped with respect to each of the plurality of external connection apparatuses which can communicate with the audio signal transmitting apparatus on the basis of a type of an audio signal which can be output by the at least one of the external connection apparatuses; and a mute signal transmitting unit to transmit a mute signal which directs the at least one of the external connection apparatuses to stop an external output of the audio signal depending on a determination of the output permission/nonpermission determining unit, wherein the audio output control unit:

controls the mute signal transmitting unit to transmit the mute signal to the at least one of the external connection apparatuses in which it is determined by the output permission/nonpermission determining unit that the external output of the audio signal is to be stopped; and controls the mute signal transmitting unit not to transmit the mute signal to a second external connection apparatus for which it is determined by the output permission/nonpermission determining unit that the external output of the audio signal does not need to be stopped.

11. The audio signal transmitting apparatus according to claim 1, further comprising:

a mute signal transmitting unit to transmit a mute signal which directs the at least one of the external connection apparatuses to stop an external output of the audio signal, and wherein the audio signal transmitting unit transmits the audio signals to the external connection apparatuses through a plurality of channels, and the audio output control unit controls the mute signal transmitting unit to transmit the mute signal to a particular external connection apparatus which externally outputs the audio signal transmitted through a specific channel of the plurality of channels.

12. The audio signal transmitting apparatus according to claim 1, further comprising:

a connection state management unit to determine, when headphone cancellation information representing that the headphone function is canceled is received, the presence/absence of the at least one of the external connection apparatuses having the valid headphone function, and wherein the audio output control unit:

performs control to maintain a stop state of an output by the external output unit when the connection state management unit determines that the at least one of the external connection apparatuses having the valid headphone function is present; and performs control to restart the output by the external output unit when the connection state management unit determines that the at least one of the external connection apparatuses having the valid headphone function is absent.

13. The audio signal transmitting apparatus according to claim 1, wherein the audio signal transmitting unit transmits the audio signals to the plurality of external connection apparatuses through the plurality of channels, and the audio signal transmitting apparatus and the external connection apparatuses output the audio signals transmitted through the different channels corresponding to the same contents.

14. The audio signal transmitting apparatus according to claim 1, wherein the audio signal transmitting apparatus can wirelessly communicate with the plurality of external connection apparatuses.

15. An audio signal receiving apparatus adapted to communicate with a plurality of external connection apparatuses and output audio signals received from the external connection apparatuses, comprising:

an audio signal receiving unit to receive the audio signal from an external connection apparatus being in a communicable state; and a headphone information transmitting unit to transmit, when a headphone function that outputs the audio signal by headphones is valid, headphone information representing validity of the headphone function to the external connection apparatus.

16. The audio signal receiving apparatus according to claim 15, further comprising:

a headphone output unit to output the audio signals received by the audio signal receiving unit by the headphones;

a channel mapping information acquiring unit to acquire channel mapping information representing types of the audio signals transmitted through a plurality of channels from the external connection apparatus;

an output permission/nonpermission determining unit to determine whether the audio signals received by the audio signal receiving unit include an audio signal for headphone output serving as a type of the audio signal which can be output from the headphone output unit on the basis of the acquired channel mapping information; and an audio output control unit to control, when the headphone function is valid and when the output permission/nonpermission determining unit determines that the audio signal for headphone output is included, to output the audio signal for headphone output to the headphone output unit.

17. The audio signal receiving apparatus according to claim 16, further comprising:

an external output unit to output the audio signal received by the audio signal receiving unit to the outside, and wherein the output permission/nonpermission determining unit further determines whether the audio signal received by the audio signal receiving unit includes an audio signal for external output serving as the type of the audio signal which can be output by the external output unit on the basis of the acquired channel mapping information, and the audio output control unit performs control to stop an output by the external output unit when the output permission/nonpermission determining unit determines that the audio signal for external output is not included and when the headphone function is valid.

18. An audio signal transmission system which includes an audio signal transmitting apparatus adapted to transmit an audio signal to an external connection apparatus, and an audio signal receiving apparatus adapted to output the audio signal received from the audio signal transmitting apparatus, wherein the audio signal transmitting apparatus comprises:

an external output unit to output the audio signal to the outside;

an audio signal transmitting unit to transmit the audio signal to the plurality of audio signal receiving apparatus being in a communicable state; and an audio output control unit to perform, when headphone information representing validity of a headphone function that outputs the audio signal by headphones is received from at least one of the audio signal receiving apparatuses which receive the audio signals, control to stop an output by the external output unit, and wherein the audio signal receiving apparatus includes:

an audio signal receiving unit to receive the audio signal from the audio signal transmitting apparatus being in a communicable state; and a headphone information transmitting unit to transmit the headphone information to the audio signal transmitting apparatus.

19. An audio signal transmission method in an audio signal transmission system including an audio signal transmitting apparatus adapted to transmit an audio signal to an external connection apparatus and an audio signal receiving apparatus adapted to output the audio signal received from the audio signal transmitting apparatus, comprising, with at least one processor:

causing the audio signal transmitting apparatus to transmit the audio signal to the audio signal receiving apparatus;

causing the audio signal receiving apparatus to receive the audio signal from the audio signal transmitting apparatus;

causing the audio signal receiving apparatus which receives the audio signal to transmit headphone information representing validity of a headphone function to the audio signal transmitting apparatus, when the headphone function that outputs the audio signal by headphones is valid; and causing the audio signal transmitting apparatus to stop an external output of the audio signal by the audio signal transmitting apparatus when the headphone information is received from at least one of the audio signal receiving apparatuses.

20. A program which is executed in an audio signal transmitting apparatus adapted to communicate with a plurality of external connection apparatuses and which transmits audio signals to the external connection apparatuses, causing a computer to realize, with at least one processor:

an audio output function that outputs the audio signal to the outside;

an audio signal transmitting function that transmits the audio signal to an external connection apparatus being in a communicable state; and an audio output control function that performs, when headphone information representing validity of a headphone function that outputs the audio signal by headphones is received from at least one of the external connection apparatuses which receive the audio signals, control to stop an output by the audio output function.

21. A program executed in an audio signal receiving apparatus adapted to communicate with a plurality of external connection apparatuses and output the audio signals received from the external connection apparatuses, causing a computer to realize, with at least one processor:

an audio signal receiving function that receives the audio signal from an audio signal transmitting apparatus being in a communicable state; and a headphone information transmitting function that transmits headphone information representing a validity of a headphone function that outputs the audio signal by headphones to the audio signal transmitting apparatus.

* * * * *